(12) United States Patent
Michihata

(10) Patent No.: US 7,445,821 B2
(45) Date of Patent: Nov. 4, 2008

(54) CELLULOSE ESTER FILM AND ITS MANUFACTURING METHOD, OPTICAL FILM, POLARIZING PLATE AND LIQUID CRYSTAL DISPLAY

(75) Inventor: Isamu Michihata, Machida (JP)

(73) Assignee: Konica Minolta Opto, Inc., Tokyo (JP)

( * ) Notice: Subject to any disclaimer, the term of this patent is extended or adjusted under 35 U.S.C. 154(b) by 423 days.

(21) Appl. No.: 11/141,931

(22) Filed: Jun. 1, 2005

(65) Prior Publication Data
US 2005/0271834 A1 Dec. 8, 2005

(30) Foreign Application Priority Data
Jun. 7, 2004 (JP) ............................ 2004-168647
Mar. 15, 2005 (JP) ............................ 2005-072201

(51) Int. Cl.
C09K 19/02 (2006.01)
C09K 19/52 (2006.01)

(52) U.S. Cl. .................... 428/1.3; 428/1.1; 428/1.31; 428/1.32; 428/1.33; 428/1.5; 428/1.54

(58) Field of Classification Search .............. 428/1.3, 428/1.32, 1.33, 1.5, 1.54
See application file for complete search history.

(56) References Cited

U.S. PATENT DOCUMENTS

| | | | |
|---|---|---|---|
| 6,652,926 B1 * | 11/2003 | Takada et al. ................. 428/1.2 |
| 6,828,006 B2 * | 12/2004 | Takada et al. ............... 428/143 |
| 6,881,457 B2 * | 4/2005 | Tasaka et al. ................ 428/1.3 |
| 6,974,608 B2 * | 12/2005 | Shimizu et al. ............ 428/1.33 |
| 7,105,213 B2 * | 9/2006 | Tasaka et al. .............. 428/1.33 |
| 7,182,981 B1 * | 2/2007 | Tachibana et al. ........... 428/1.1 |
| 7,264,865 B2 * | 9/2007 | Matsunaga et al. .......... 428/141 |
| 7,271,862 B2 * | 9/2007 | Matsunaga et al. ........... 349/64 |
| 2002/0041352 A1 * | 4/2002 | Kuzuhara et al. ........... 349/117 |
| 2002/0102368 A1 * | 8/2002 | Ono et al. .................. 428/1.33 |
| 2002/0102369 A1 * | 8/2002 | Shimizu et al. ............ 428/1.33 |
| 2003/0129327 A1 * | 7/2003 | Shibue et al. ................ 428/1.1 |
| 2003/0170482 A1 * | 9/2003 | Murakami .................. 428/615 |
| 2004/0080693 A1 * | 4/2004 | Kuzuhara et al. ........... 349/117 |
| 2004/0161551 A1 * | 8/2004 | Tasaka et al. ................ 428/1.3 |
| 2005/0142304 A1 * | 6/2005 | Kawanishi et al. ......... 428/1.31 |
| 2005/0163942 A1 * | 7/2005 | Tasaka et al. ................ 428/1.3 |
| 2005/0208231 A1 * | 9/2005 | Nimura et al. ............... 428/1.3 |
| 2006/0029750 A1 * | 2/2006 | Shimizu et al. ............ 428/1.31 |
| 2006/0060997 A1 * | 3/2006 | Nagai et al. ................ 264/1.31 |
| 2006/0115609 A1 * | 6/2006 | Shimizu et al. ............. 428/1.3 |
| 2006/0115610 A1 * | 6/2006 | Nagashima ................. 428/1.3 |
| 2006/0127607 A1 * | 6/2006 | Okubo et al. ................ 428/1.3 |
| 2006/0216439 A1 * | 9/2006 | Shimizu et al. ............ 428/1.31 |
| 2006/0268200 A1 * | 11/2006 | Ohgaru et al. ................. 349/97 |
| 2007/0047087 A1 * | 3/2007 | Fukuda et al. .............. 359/582 |
| 2007/0172605 A1 * | 7/2007 | Ohtani et al. .............. 428/1.31 |

* cited by examiner

Primary Examiner—Carol Chaney
Assistant Examiner—Michele Jacobson
(74) Attorney, Agent, or Firm—Lucas & Mercanti, LLP

(57) ABSTRACT

Disclosed is a cellulose ester film containing cellulose ester and microparticles having an average primary particle diameter of from 0.1 to 1.0 μm, wherein a relative standard deviation of a primary particle diameter of the microparticles is from 1 to 20%, and wherein the cellulose ester film has a surface with a peak density of from 1,000 to 8,000 (1/mm²).

15 Claims, 2 Drawing Sheets

CELLULOSE ESTER FILM AND ITS MANUFACTURING METHOD, OPTICAL FILM, POLARIZING PLATE AND LIQUID CRYSTAL DISPLAY

This application is based on Japanese Patent Application Nos. 2004-168647 filed on Jun. 7, 2004, and 2005-072201 fined on Mar. 15, 2005 in Japanese Patent Office, the entire content of which is hereby incorporated by reference.

FIELD OF THE INVENTION

The present invention relates to a cellulose ester film for optical use (hereinafter also referred to as a film) and its manufacturing method, and particularly to a cellulose ester film used in a polarizing plate protective film, a retardation film or a viewing angle increasing film for a liquid crystal display, in functional films for a plasma display such as an antireflection film, or in functional films for an organic EL display and its manufacturing method, and to an optical film, a polarizing plate and a liquid crystal display employing the cellulose ester film.

BACKGROUND OF THE INVENTION

Recently, study and development has been made regarding decrease in thickness and weight of a note board type personal computer, enlargement of a display or high precision of image. In parallel with this development, decrease in thickness, increase in width and improvement of quality of a polarizing plate protective film has been strongly required. Generally, a cellulose ester film is widely used as the polarizing plate protective film. The cellulose ester film is wound around a spool to form a film roll, which is stored or transported.

As the display panel size is enlarged, a film roll with large width and a long length has been required. However, such a film roll has problem in storage stability. There is, for example, problem that the films are adhered to each other to deform or the films form a convex shape as if there is foreign matter between the films. In order to overcome such a problem, a method has been proposed in which microparticles are added to a film (see Japanese Patent O.P.I. Publication No. 2001-114907). However, this method has problem in that when the amount of microparticles added to cellulose ester film is increased, it increases haze of the cellulose ester film, resulting in lowering of transparency.

Recently, as demand to high image quality is strong, a film without foreign matter and with high transparency has been required. It is difficult to obtain a cellulose ester film with improved sliding property and high transparency by increasing an amount of microparticles to be added to a cellulose ester film.

The present inventor has found that in the above method, the film, in which 10-20 nm microparticles are used as secondary particles, have many protrusions on the film surface, but protrusions contributing to sliding property are a few, and protrusions, which do not contribute to sliding property, increase haze.

In order to overcome the problem, a method is proposed in which a center-line average surface roughness Ra of film is limited (see Japanese Patent O.P.I. Publication No. 2003-326542). Ra is a parameter which is not influenced by a distance between protrusions of the film surface or a density of the protrusions each being an important factor when the film contacting each other is stored for a long period. Therefore, there is problem in that the same Ra value may provide different effects in sliding property, haze or storage stability.

SUMMARY OF THE INVENTION

The present invention has been made in view of the above. An object of the invention is to provide a cellulose ester film, which is excellent in storage stability or productivity, and free from foreign matter, and its manufacturing method. Another object of the invention is to provide an optical film, a polarizing plate and a display, each comprising the cellulose ester film, which are excellent in flatness or appearance and minimizes variation of retardation.

BRIEF EXPLANATION OF THE DRAWINGS

FIG. 1($b$) is a schematic view showing a second embodiment of a solution cast film manufacture process.

FIG. 1($c$) is a schematic view showing a third embodiment of a solution cast film manufacture process.

FIG. 1($d$) is a schematic view showing a fourth embodiment of a solution cast film manufacture process.

DETAILED DESCRIPTION OF THE INVENTION

Figure 1:
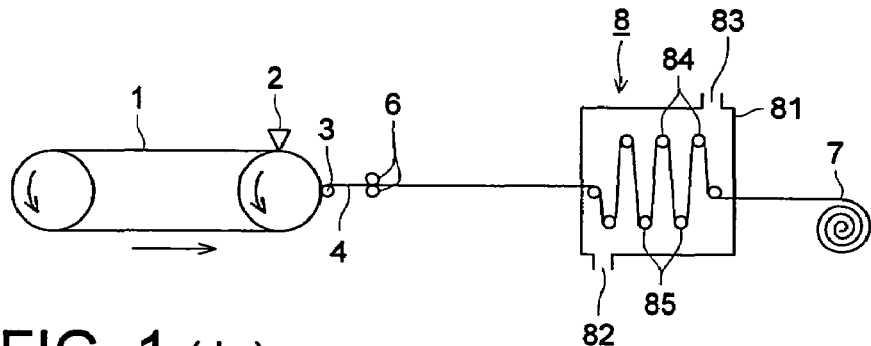
FIG. 1($a$) is a schematic view showing a first embodiment of a solution cast film manufacture process.
Figure 1:
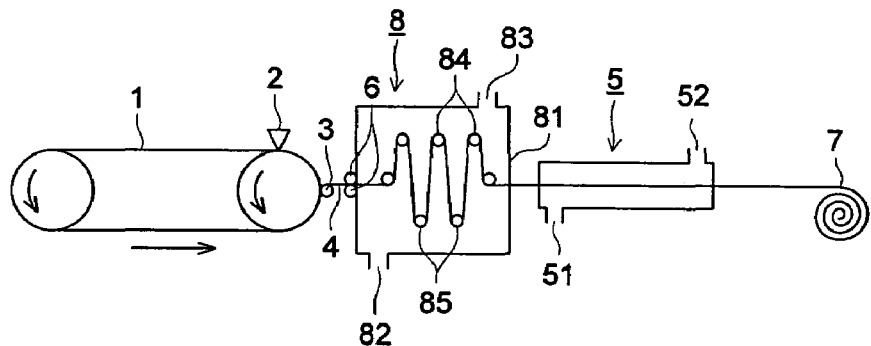
Figure 1:
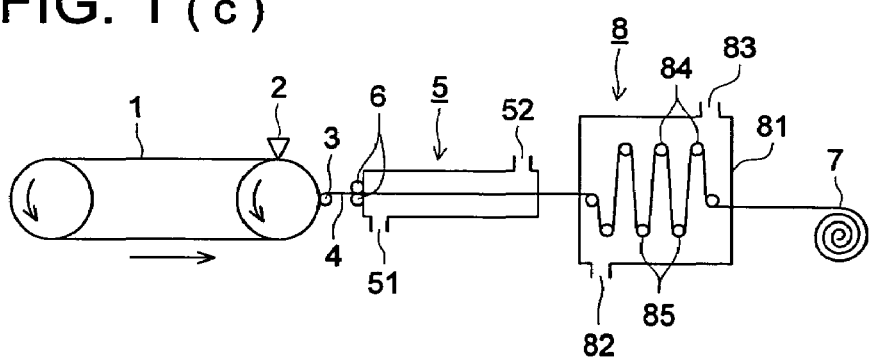
Figure 1:
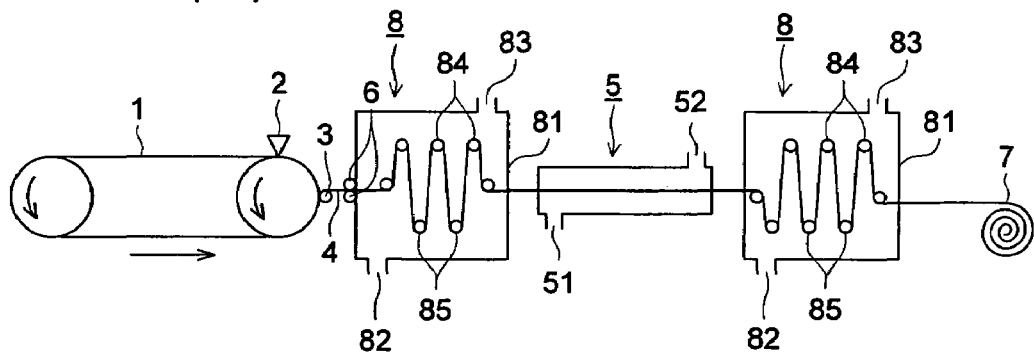

The above objects of the invention can be attained by the followings:

1. A cellulose ester film containing cellulose ester and microparticles having an average primary particle diameter of from 0.1 to 1.0 μm, wherein a relative standard deviation of a primary particle diameter of the microparticles is from 1 to 20%, and wherein the cellulose ester film has a surface with a peak density of from 1,000 to 8,000 (1/mm$^2$).

2. The cellulose ester film of item 1 above, wherein the film is stretched at a stretching magnification of from 1.05 to 1.3 in at least one direction of the mechanical (MD) direction and the transverse (TD) direction.

3. The cellulose ester film of item 1 above, wherein the film contains an aromatic compound having a 1,3,5-triazine ring as a UV absorbent.

4. The cellulose ester film of item 3 above, wherein the aromatic compound is a compound represented by formula

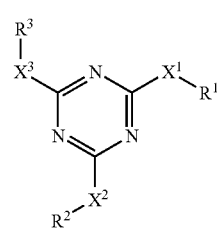

Formula (I)

wherein $X^1$ represents a single bond, —$NR^4$—, —O— or —S—; $X^2$ represents a single bond, —$NR^5$—, —O— or —S—; $X^3$ represents a single bond, —$NR^6$—, —O— or —S—; $R^1$, $R^2$, and $R^3$ each represents an alkyl group, an alkenyl group, an aryl group or a heterocyclic group; and $R^4$, $R^5$ and $R^6$ each represents a hydrogen atom, an alkyl group, an alkenyl group, an aryl group or a heterocyclic group.

5. The cellulose ester film of item 1 above, wherein the film contains a plasticizer in an amount of from 1 to 30% by weight.

6. The cellulose ester film of item 1 above, wherein the film contains a plasticizer in an amount of from 2 to 25% by weight.

7. The cellulose ester film of item 5 above, wherein the plasticizer is an ester of a polyhydric alcohol with a monocarboxylic acid.

8. The cellulose ester film of item 1 above, wherein the film contains the cellulose ester in an amount of from 60 to 95% by weight.

9. The cellulose ester film of item 1 above, wherein the film contains the microparticles in an amount of from 0.02 g/m² to 1.0 g/m².

10. The cellulose ester film of item 1 above, wherein the film contains the microparticles in an amount of from 0.03 g/m² to 0.3 g/m².

11. The cellulose ester film of item 1 above, wherein the film has a thickness of from 10 to 120 μm.

12. The cellulose ester film of item 1 above, wherein the film has a thickness of from 10 to 60 μm.

13. A polarizing plate comprising a polarizing film and the cellulose ester film of item 1 above.

14. A liquid crystal display comprising a liquid crystal cell and the cellulose ester film of item 1 above.

15. The liquid crystal display of item 14 above, further comprising a polarizing film.

The preferred embodiment of the invention will be detailed below, but the invention is not limited thereto.

The present inventor has made an extensive study on the above problems. As a result, he has found that when a cellulose ester film, comprising microparticles having an average primary particle diameter of from 0.1 to 1.0 μm and a relative standard deviation of the primary particle diameter of from 1 to 20%, has a surface peak density of from 1,000 to 8,000 (1/mm²), the cellulose ester film can provide excellent sliding property and reduced haze, and a surface peak density of a cellulose ester film can provide a new parameter for sliding property, haze, and long-length storage stability which has been hitherto argued in relation with a center line average surface roughness Ra of cellulose ester film, and has completed the invention.

The present inventor has also found that an optical film such as a hard coat film or an antireflection film employing the cellulose ester film above is excellent in flatness, appearance, and retardation variation.

The present invention will be detailed below.

(Microparticles)

The microparticles used for the cellulose ester film of the invention have an average primary particle diameter of from 0.1 to 1.0 μm, preferably from 0.1 to 0.5 μm, and more preferably from 0.2 to 0.3 μm. The above average primary particle diameter range is preferred, since a greater average primary particle diameter exhibits better dispersibility, while a less average primary particle diameter better transparency. An average primary particle diameter of the microparticles is determined as follows: The microparticles are photographed (by a factor of from 500,000 to 2,000,000) through a transmission electron microscope to obtain photographic microparticle images. The photographic microparticle images is electronically processed employing a flat head scanner Sitios manufactured by Konica Minolta Co., Ltd. to obtain electronic data, and the resulting electronic data is analyzed through an image analysis software, Image Pro Plus to obtain an average primary particle diameter of the microparticles. Herein, the primary particle diameter is represented by a diameter of a circle having the same area as the projected image of the microparticle. The relative standard deviation of a primary particle diameter is also determined from the data obtained above. The image analysis is carried out under the following conditions:

Filter treatment: Median 3×3→Leveling 20 pixels 3→High Pass 3→Median 3×3

In the invention, the relative standard deviation of a primary particle diameter of the microparticles is from 1 to 20%, and preferably from 1 to 10%.

Examples of the microparticles include those of silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate, calcium phosphate, a silicone resin, a fluorine-containing resin and an acryl resin. Among these, silicon dioxide microparticles are especially preferred.

The microparticles in the invention is preferably microcapsules obtained by hydrolytic condensation of a reactive silicon compound. This method can adjust easily the relative standard deviation of the average primary particle diameter, exhibiting the effects of the invention. For example, there is a method disclosed in Japanese Patent Publication No. 5-4325 in which an alkoxysilane compound in the organic solution is hydrolytically condensed in the presence of excessive water, or a method disclosed in Japanese Patent No. 348461 in which an alkoxysilane compound in the gaseous phase is hydrolytically condensed in the presence of water droplets. There is, further, a method disclosed in Japanese Patent Publication No. 6-57317 in which microcapsules are dispersed in glycol, or a method disclosed in Japanese Patent No. 318752.

The cellulose ester film has a surface peak density of from 1,000 to 8,000 (1/mm²), preferably from 2,000 to 6,000 (1/mm²), and more preferably from 3,000 to 5,000 (1/mm²). The above surface peak density range is preferred, since a greater surface peak density exhibits better sliding property, while a less surface peak density better transparency. The above surface peak density range can be obtained by adjusting the above average primary particle diameter of the microparticles and the above relative standard deviation of the particle diameter of the microcapsules. The microparticle content of the cellulose ester film of the invention is preferably from 0.02 to 1.0 g/m², more preferably from 0.03 to 0.3 g/m², and most preferably from 0.08 to 0.2 g/m².

In the invention, the surface peak density is measured as follows: The number of peaks with a height of not less than 3 nm (preferably from 3 to 500 nm) on the film surface is measured at 23° C. and at a relative humidity RH of 50%+5% RH at an objective lens magnification of 50 and at an image zoom magnification of 1.0, employing a three dimensional surface structure analysis microscope zygo new View 5000 available from Canon Sales Co., Inc., and divided by an area measured to obtain the number per 1 mm² of the peaks. In the invention, the surface peak density is represented in terms of the peak number per mm² of the film.

In order to incorporate the microparticles in the invention into the cellulose ester film, an addition solution containing the microparticles is added to a dope as described later. A main dope to which the microparticles in powder are directly added results in insufficient dispersion, and a filter clogs with microparticle aggregates, resulting in rapid increase of filtration pressure. Therefore, it is preferred that a main dope, after added with the addition solution containing the microparticles, is filtered with for example, a filter capturing microparticles with a particle diameter of from 0.5 to 5 μm and giving a filtration time of from 10 to 25 sec/100 ml. Incorporation of the addition solution containing the microparticles to the main dope may be any time before filtration as described above. The addition solution may be incorporated in the main dope placed in a dissolution vessel, or the main dope and the addition solution may be mixed in a mixing vessel provided separately. Before filtration, they may be mixed through a static mixer in a pipe leading to a filter. In most cases, the main dope contains return scraps in an amount of from 1.0 to 50% by weight. Since the return scraps contain microparticles, the content of the microparticles in the addition solution need to be adjusted depending upon the amount of the return scraps contained in the main dope. A method, in which the addition solution is added directly to the main dope and batch control is possible, or a method, in which the main dope and the addition solution are mixed in a mixing vessel, is preferred in view of ease of control. The former method is more preferred since time for mixing the main dope and the addition solution is sufficient and excellent productivity is obtained. The addition solution contains the microparticles in an amount of preferably from 0.5 to 10% by weight, more preferably from 1 to 5% by weight, and still more preferably from 1 to 3% by weight.

An addition solution having a low content of the microparticles is low in viscosity, which is easy to handle, while an addition solution having a high content of the microparticles can be added in a small amount to the main dope, which is easy to add. Therefore, the above microparticle content range is preferred. The return scraps herein referred to are cellulose ester pieces, for example, pieces produced by cutting the both edges of cellulose ester film web during manufacture, or cellulose ester film falling outside the specifications on account of scratches.

The main dope in the invention refers to a dope for manufacturing the cellulose ester film of the invention, and is distinguished from the addition solution. Resin, which the main dope contains in a high concentration, may be added in a small amount to the addition solution. In the invention, a dope containing most of film forming resin is referred to as the main dope, which is distinguished from the addition solution.

In in-line addition, a filter or a supply pump, disclosed in Japanese Patent O.P.I. Publication No. 2001-213974, is preferably used.

It is preferred in view of viscosity adjustment or dispersion stability that the addition solution contains cellulose ester as well as the microparticles. The cellulose ester content of the microparticle addition solution is preferably from 2 to 5% by weight, and more preferably from 3 to 4% by weight. The cellulose ester used in the addition solution may be the same as those in the main dope described above, and the return scraps described above. The cellulose ester in the invention is preferably cellulose ester satisfying formulae (1) and (2) described below, providing excellent disperisibility and preventing aggregation of microparticles. The reason is considered to exhibit dispersion effect of a dispersant that the propionyl group or butyryl group of the cellulose ester is absorbed onto the microparticle surface.

$$2.6 \leq X+Y \leq 3.0 \quad \text{Formula (1)}$$

$$0 \leq X \leq 2.5 \quad \text{Formula (2)}$$

wherein X represents an acetyl substitution degree, and Y represents a propionyl or butyryl substitution degree.

Among the cellulose esters, cellulose acetate propionate satisfying $1.9 \leq X \leq 2.5$ and $0.1 \leq Y \leq 0.9$ is most preferable. Free hydroxyl groups exist at the portions, which are not substituted with an acyl group. These cellulose esters can be synthesized according to conventional synthetic methods.

The acyl substitution degree of the cellulose ester can be measured according to ASTM-D-817-96.

As the cellulose ester contained in the microparticle addition solution, there is a mixed fatty acid ester of cellulose such as cellulose acetate propionate, or cellulose acetate butyrate as disclosed in Japanese Patent O.P.I. Publication Nos. 10-45804 and 8-231761 and U.S. Pat. No. 2,319,052. Of these lower fatty acid esters of celluloses, cellulose acetate propionate is especially preferred. These cellulose esters may be used in combination.

A disperser used in dispersion of microparticles is preferably a sand mill or a high pressure homogenizer. A sand mill, containing beads with a size of 0.3-3 mmφ and mill bases, and a disc, disperses microparticles by causing collision and shearing employing a centrifugal force of beads produced by rotating the disc at 300-3000 rpm. Examples of the beads include glass beads, zirconia beads, alumina beads, and steel beads. In the invention, zirconia beads having less contamination or glass beads in which contamination is not problem is preferred. In the sand mill, there are various types of a longitudinal, lateral or annular type. In the invention, a lateral or annular type sand mill is especially preferred in providing a more uniform shearing force. The disc, shaft or walls in the sand mill are cut off by beads to produce contaminations. Therefore, it is preferred that the disc, shaft or walls in the mill are coated with ceramics or Teflon (Trade Name) to minimize the contaminations.

Examples of the sand mill include DAINO MILL (produced by W.A. Bachofen Co., Ltd.), NEW MYMILL (produced by Mitsui Kozan Co., Ltd.), SC MILL (produced by Mitsui Kozan Co., Ltd.), and NANO GRAIN MILL (produced by Asada Tekko Co., Ltd.).

The high pressure homogenizer is a medialess disperser which carries out dispersion employing shearing force or collision impact produced by passing a mill base at high speed through narrow tubes or orifices. For example, mill bases are allowed to collide with each other at a high pressure of 10 to 300 MPa, or to pass through narrow tubes or orifices having a diameter of from 50 to 2,000 μm.

Examples of the high pressure homogenizer include MICRO FLUIDIZER (produced by Mizuho Kogyo Co., Ltd.), ULTIMIZER (produced by Sugino Machine Co., Ltd.), NANOMIZER (produced by Yoshida Kogyo Co., Ltd.), and CLEAR MIX and CLEAR MIX W MOTION (each produced by M Technique Co., Ltd.).

Dispersers such as an ultrasonic disperser, a ball mill, a high speed disper, or atriter are not preferred, since they have a poor shearing force and is difficult to obtain particles with an average primary particle diameter of from 0.1 to 1.0 μm, resulting in increase of haze or foreign matter. Dispersers such as a three roll mill, a Henschel Mixer, and a kneader are not preferred also, since they have too strong shearing force and break particles with an average primary particle diameter of from 0.1 to 1.0 μm, resulting in increase of foreign matter or in sliding property lowering.

The microparticle addition solution may contain a polymer such as a silicone resin, a fluorine-containing resin or an acryl polymer. The silicone resin is preferred, and a silicone resin with a three dimensional network structure is especially preferred. Examples of such a silicone resin with a three dimensional network structure include Tospearl 103, 105, 108, 120, 145, 3210, or 240, each produced by Toshiba Silicone Co., Ltd., which is available on the market.

As the methods of preparing the addition solution containing microparticles, there are the following methods, but the invention is not limited thereto.

(Method A)

A solvent and the microparticles are mixed in a disperser with stirring, and dispersed to obtain a microparticle dispersion. The dispersion is diluted with a solvent, added with a small amount of cellulose ester or a main dope, and stirred.

(Method B)

A solvent and the microparticles are mixed in a disperser with stirring, and dispersed to obtain a microparticle dispersion. Separately, a small amount of cellulose ester or a main dope is dissolved in a solvent with stirring, and added with the above dispersion to obtain a microparticle addition solution.

(Method C)

A small amount of cellulose ester or a main dope is dissolved in a solvent with stirring, added with microparticles to obtain a microparticle addition solution.

(Method D)

A solvent and microparticles are mixed, and dispersed in a disperser to obtain a microparticle dispersion. The resulting microparticle dispersion is mixed with a solvent to obtain a microparticle addition solution.

It is preferred that the addition solution contains a small amount of cellulose ester in that aggregation occurring when it is added to the main dope is reduced. The method C is especially preferred in that aggregation occurring when the addition solution is prepared is reduced.

The organic solvents used in dispersion of microparticles include those used in the preparation of a cellulose ester film. Alcohols are especially preferred, and examples of the alcohols include alcohols having a carbon atom number of from 1 to 8 such as methanol, ethanol, n-propanol, iso-propanol, n-butanol, sec-butanol, and tert-butanol.

When microparticles and solvents are mixed and dispersed to obtain a dispersion, the microparticle concentration of the dispersion is preferably 5 to 30% by weight, more preferably 8 to 25% by weight, and most preferably 10 to 15% by weight. The higher concentration of the microparticles tends to lower the turbidity of the dispersion, lowers haze, and minimizes occurrence of aggregates, which is preferable. When microparticles, solvents and a small amount of resin are mixed and dispersed to obtain a dispersion, the microparticle concentration of the dispersion is preferably 0.5 to 10% by weight, more preferably 1 to 5% by weight, and most preferably 1 to 3% by weight, and the resin concentration of the dispersion is preferably 2 to 10% by weight, more preferably 3 to 7% by weight, and most preferably 4 to 6% by weight. The above concentration range of the resin is preferred in that excellent dipersibility is attained.

The addition solution can contain a UV absorbent, but it is preferred in dispersibility of the microparticles that the addition solution does not substantially contain a UV absorbent.

As another addition solution to be added to the main dope, there is a UV absorbent-containing addition solution. The UV absorbent-containing addition solution is a liquid containing the UV absorbent described later which is to be in-line added to the main dope. The UV absorbent content of the UV absorbent-containing addition solution is preferably 1 to 30% by weight, more preferably 5 to 20% by weight, and most preferably 10 to 15% by weight. The above UV absorbent content range is preferred, since the less content of UV absorbent provides excellent solubility, and the higher content of UV absorbent enables small amount addition to the main dope, and facilitates in-line addition.

It is preferred in view of viscosity adjustment that the addition solution contains cellulose ester as well as the UV absorbent. The cellulose ester used in the addition solution may be the same as those in the main dope described above, and the return scraps described above.

In the invention, it is especially preferred that the addition solution containing microparticles is added to the main dope, and filtered with a filter capturing microparticles with a particle diameter of from 0.5 to 5 μm and giving a filtration time of from 10 to 25 sec/100 ml, and an addition solution, which contains UV absorbents but does not substantially contain microparticles, is in-line added to the resulting liquid. The variation of a transmittance at 400 nm or less of cellulose ester film due to lots is required to be within 1%. However, the main dope may contain 10 to 50% of the return scraps, and the UV absorbent content of the return scraps may vary the transmittance at 400 nm or less of cellulose ester film. Therefore, it is important that the UV absorbent amount is adjusted in the above in-line addition whereby variation of the transmittance due to lots can be controlled to be within 1%. The UV absorbent amount can be also adjusted by a method in which a part of the UV absorbent to be added to cellulose ester film is added to the main dope, and the rest is in-line added. This method reduces the UV absorbent amount in the in-line addition, and provides excellent productivity. UV absorbents added to the main dope may be added in the form of solid or in the form of solution in which the UV absorbents are dissolved in a solvent.

The addition solution, which contains UV absorbents but does not substantially contain microparticles, refers to an addition solution containing UV absorbents, which contains microparticles in an amount of not more than 1% by weight, or an addition solution containing UV absorbents, which contains no microparticles. The addition solution, which contains no microparticles, is more preferred. The addition solution containing UV absorbents and microparticles to be in-line added is likely to produce aggregates resulting in foreign matter, and therefore, the less content of the microparticles is preferred.

The UV absorbent absorbs ultraviolet rays of 400 nm or less, whereby durability of the cellulose ester film is improved. The transmittance at 380 nm or less of cellulose ester film is preferably not more than 10%, more preferably not more than 5%, and still more preferably not more than 2%.

The UV absorbents used in the invention are preferably UV absorbents, which are liquid at a temperature of not more than 20° C. The UV absorbents, which are liquid at a temperature of not more than 20° C. reduces Rt variation of stretched cellulose ester film, which is preferred. The UV absorbents used in the invention are not specifically limited but include an oxybenzophenone compound, a benzotriazole compound, a salicylic acid ester compound, a benzophenone compound, a cyanoacrylate compound and a triazine compound.

As UV absorbents preferably used in the invention, the benzotriazole or benzophenone type UV absorbent is preferably used which has high transparency, and minimizes deterioration of a polarizing plate or a liquid crystal. The benzotriazole type UV absorbent is especially preferably used, since it minimizes undesired coloration. Examples of the UV absorbents include 5-chloro-2-(3,5-di-sec-butyl-2-hydroxyphenyl)-2H-benzotriazole, (2-2H-benzotriazole-2-yl)-6-(straight-chained or branched dodecyl)-4-methylphenol, 2-hydroxy-4-benzyloxybenzophenone, and 2,4-dibenzyloxybenzophenone, and include commercially available TINUBIN 109, 171, 234, 326, 327, and 328 (each produced by Ciba Specialty Chemicals Co., Ltd.) which are preferably used. Among these, TINUBIN 109 and 171, which are liquid at a temperature of not more than 20° C., are more preferred.

As the UV absorbents for the optical film of the invention, a compound with a 1,3,5-triazine ring is preferably used.

Among the compounds with a 1,3,5-triazine ring, a compound represented by Formula (I) is preferred.

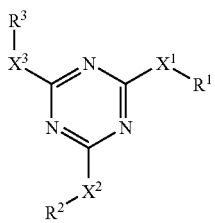

Formula (I)

wherein $X^1$ represents a single bond, —$NR^4$—, —O— or —S—; $X^2$ represents a single bond, —$NR^5$—, —O— or —S—; $X^3$ represents a single bond, —$NR^6$—, —O—, or —S—; $R^1$, $R^2$, and $R^3$ each represents an alkyl group, an alkenyl group, an aryl group, or a heterocyclic group; and $R^4$, $R^5$ and $R^6$ each represents a hydrogen atom, an alkyl group, an alkenyl group, an aryl group or a heterocyclic group.

A melamine compound is specifically preferable among the compounds represented by Formula (I).

In a melamine compound represented by Formula (I), $X^1$, $X^2$, and $X^3$ represent —$NR^4$—, —$NR^5$—, and —$NR^6$—, respectively; or $X^1$, $X^2$, and $X^3$ each represents a bond, and $R^1$, $R^2$, and $R^3$ each represents a heterocyclic group having a free valence at nitrogen atoms. —$X^1$—$R^1$, —$X^2$—$R^2$, and —$X^3$$R^3$ are preferably the same substituents. $R^1$, $R^2$, and $R^3$ are specifically preferably aryl groups. $R^4$, $R^5$, and $R^6$ are specifically preferably hydrogen atoms.

As the above alkyl group, a chain alkyl group is more preferable than a cyclic alkyl group, and a straight-chain alkyl group is more preferable than a branched alkyl group.

The number of carbon atoms in the alkyl group is preferably 1 to 30, more preferably 1 to 20, still more preferably 1 to 10, further still more preferably 1 to 8 and most preferably 1 to 6. The alkyl group may have a substituent.

Examples of the substituent include: a halogen atom, an alkoxy group (for example, a methoxy group, an ethoxy group, and epoxyethyloxy group), an acyloxy group (for example, an acryloyloxy group and a methacryloyloxy group). As the above alkenyl group, a chain alkenyl group is more preferable than a cyclic alkenyl group and a straight-chain alkenyl group is more preferable than a branched alkenyl group. The number of carbon atoms in the alkenyl group is preferably 2 to 30, more preferably 2 to 20, still more preferably 2 to 10, further still more preferably 2 to 8 and most preferably 2 to 6. The alkenyl group may have a substituent.

Examples of the substituent include a halogen atom, an alkoxy group (for example, a methoxy group and an ethoxy group, and an epoxyethyloxy group) and an acyloxy group (for example, an acryloyloxy group and a methacryloyloxy group).

As the above aryl group, a phenyl group or a naphthyl group is preferable, and a phenyl group is specifically preferable. The aryl group may have a substituent.

Examples of the substituent include a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfonamides group, a carbamoyl group, an alkyl substituted carbamoyl group, an alkenyl substituted carbamoyl group, an aryl substituted carbamoyl group, an amide group, an alkylthio group, an alkenylthio group, an arylthio group, and an acyl group. The alkyl groups described here are common to the aforementioned alkyl groups.

The alkyl portions of the alkoxy group, the acyloxy group, the alkoxycarbonyl group, the alkyl substitute sulfamoyl group, the sulfonamide group, the alkyl substituted carbamoyl group, the amide group, the alkylthio group, and the acyl group described here are the same as denoted in the aforementioned alkyl groups.

The alkenyl groups described here are the same as denoted in the aforementioned alkenyl groups.

The alkenyl portions of an alkenyloxy group, an acyloxy group, an alkenyloxycarbonyl group, an alkenyl substituted sulfamoyl group, a sulfonamide group, an alkenyl substituted carbamoyl group, an amide group, an alkenylthio group, and an acyl group represents the same as those previously mentioned.

Examples of the above aryl group include a phenyl group, an α-naphthyl group, a β-naphthyl group, a 4-methoxyphenyl group, a 3,4-diethoxyphenyl group, a 4-octyloxyphenyl group, and a 4-dodecyloxyphenyl group.

The examples of aryl portions of an aryloxy group, an acyloxy group, an aryloxycarbonyl group, an aryl substituted sulfamoyl group, a sulfonamide group, an aryl substituted carbamoyl group, an amide group, an arylthio group, and an acyl group are the same as denoted in the aforementioned examples.

When $X^1$, $X^2$, and $X^3$ each are —NR—, —O—, or —S—, the heterocyclic group preferably has aromaticity.

The heterocyclic ring contained in the heterocyclic group having aromaticity is generally an unsaturated heterocyclic ring and preferably has the maximum number of double bonds. The heterocyclic ring is preferably a 5 membered ring, a 6 membered ring, or a 7 membered ring, more preferably a 5 membered ring, or a 6 membered ring, and most preferably a 6 membered ring.

The hetero atom in the heterocyclic ring is preferably an N atom, an S atom, or an O atom, and specifically preferably an N atom.

As the aromatic heterocyclic ring, a pyridine ring (for example, a 2-pyridyl group or a 4-pyridyl group) is specifically preferable. The heterocyclic group may have a substituent. Examples of the substituents are the same as denoted in the aryl group described above.

When $X^1$, $X^2$, or $X^3$ is a bond, the heterocyclic group preferably has a free valence at an N atom. The heterocyclic group which has a free valence at an N atom is preferably a 5 membered ring, a 6 membered ring, or a 7 membered ring, more preferably a 5 membered ring, or a 6 membered ring, and most preferably a 5 membered ring. The heterocyclic group may have a plurality of N atoms.

The hetero atom contained in a heterocyclic group may be a hetero atom other than a nitrogen atom (for example, an O atom or an S atom). The heterocyclic group may have a substituent. Examples of the substituents are the same as denoted in the aryl group described above.

Examples of the heterocyclic group having a free valence at an N atom will be shown below.

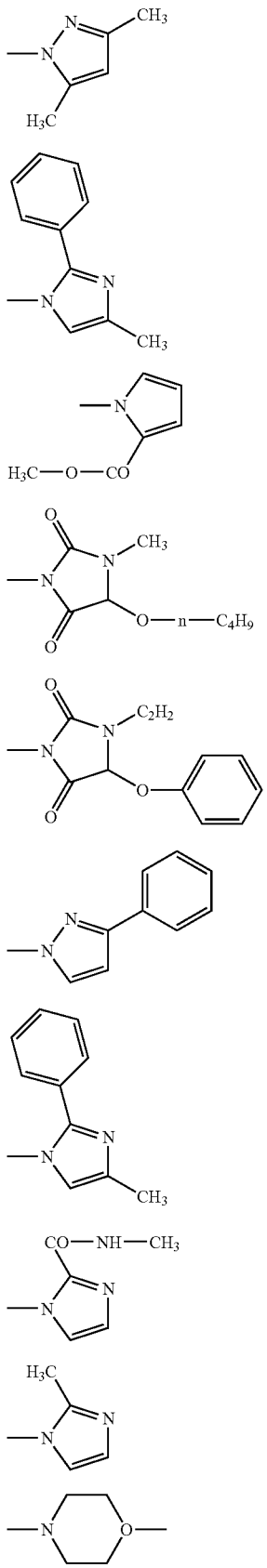

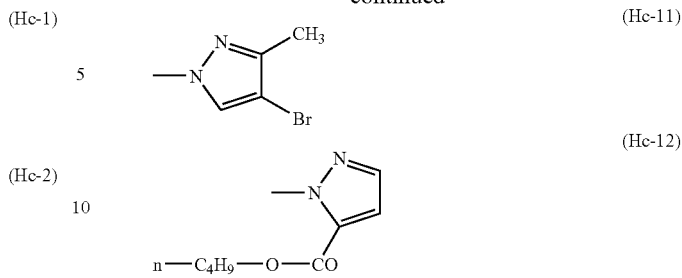

The compound with a 1,3,5-triazine ring has a molecular weight of from 300 to 2000. The boiling point of the compound is preferably not less than 260° C. The boiling point is measured through a melting point measuring apparatus available on the market (for example, TG/DTA100, produced by Seiko Electronic Co., Ltd.).

Examples of the compound with a 1,3,5-triazine ring will be shown below.

In the following, a plurality of R represent the same groups.

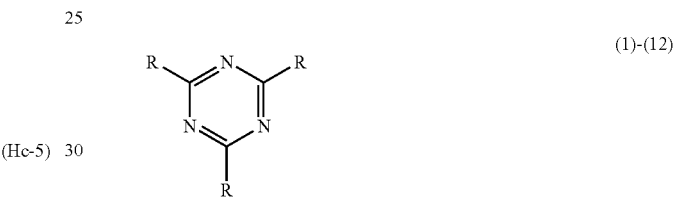

(1) butyl
(2) 2-methoxy-2-ethoxyethyl
(3) 5-undecenyl
(4) phenyl
(5) 4-ethoxycarbonylphenyl
(6) 4-butoxyphenyl
(7) p-biphenylyl
(8) 4-pyridyl
(9) 2-naphthyl
(10) 2-methylphenyl
(11) 3,4-dimethoxyphenyl
(12) 2-furyl

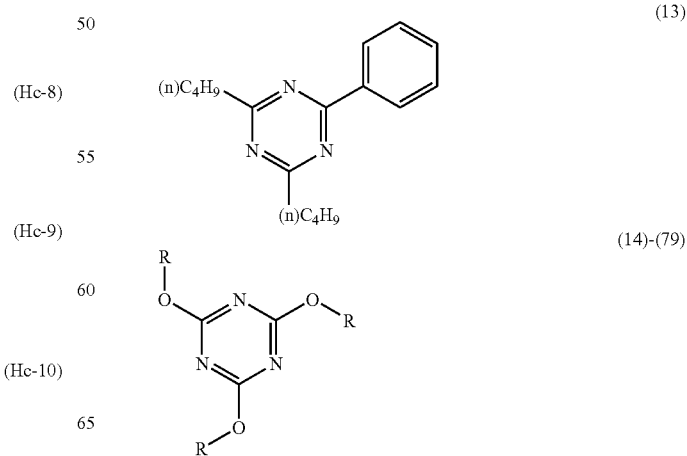

(14) phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

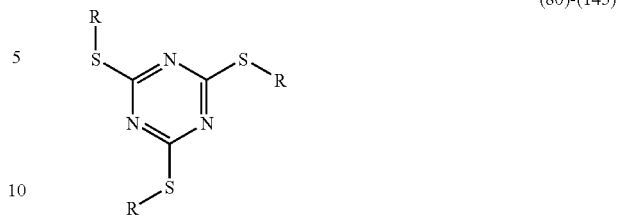

(80)-(145)

(80) phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3 Hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphehyl
(131) 2-naphthyl
(132) 3,4,5-triethoxycarbonylphenyl
(133) 3,4,5-tributoxyphenyl (134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl

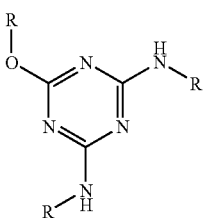

(146)-(164)

(146) phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl

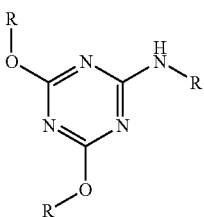

(165)-(183)

(165) phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl
(176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

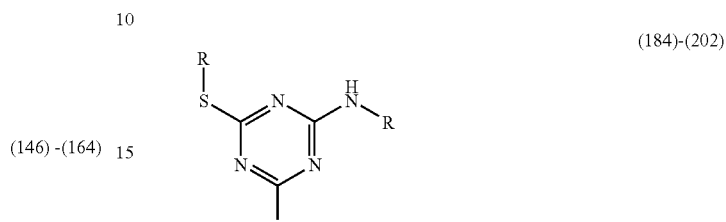

(184)-(202)

(184) Phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

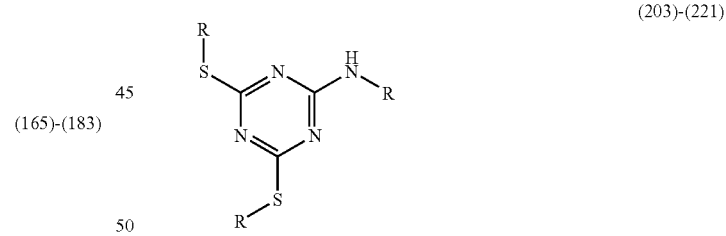

(203)-(221)

(203) phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxy-1-phenyl
(212) 4-phenoxycarbonylphenyl
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl (218) 4-(3,3-diethylureido)phenyl
(219) 4-methylphenyl
(220) 4-phenoxyphenyl
(221) 4-hydroxyphenyl

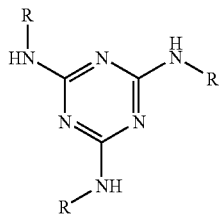

(222) phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxiphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3 Hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl
(272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutyrylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2 Hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl (341) 2,3-dihydroxy phenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydroxyphenyl
(370) 2, 4, 6-tributylphenyl
(371) 2, 4, 6-tri(2-methoxy-2-ethoxyethyl)phenyl
(372) 2, 4, 6-triphenylphenyl
(373) 2, 4, 6-triethoxycarbonylphenyl
(374) 2, 4, 6-tridodecyloxyphenyl
(375) 2, 4, 6-trimethylphenyl
(376) 2, 4, 6-trichlorophenyl
(377) 2, 4, 6-tribenzoylphenyl
(378) 2, 4, 6-triacetoxyphenyl
(379) 2, 4, 6-trimethoxyphenyl
(3.80) 2, 4, 6-tri-N-methylaminophenyl
(381) 2, 4, 6-triisobutyrylaminophenyl
(382) 2,4,6-triphenoxyphenyl
(383) 2, 4, 6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenyl sulfamoyl-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl
(403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsulfamoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

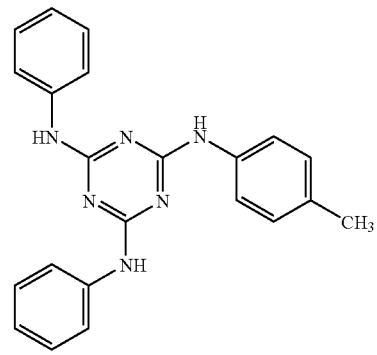

(420)

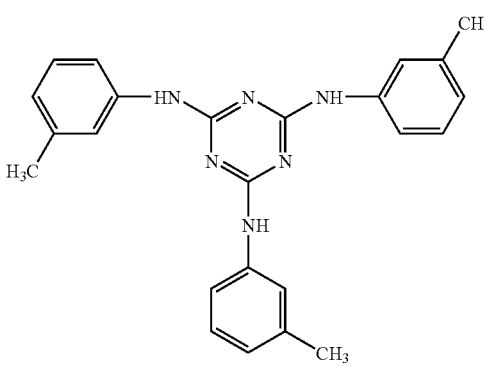

(420')

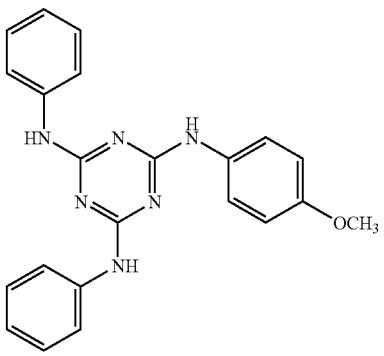

(421)

-continued
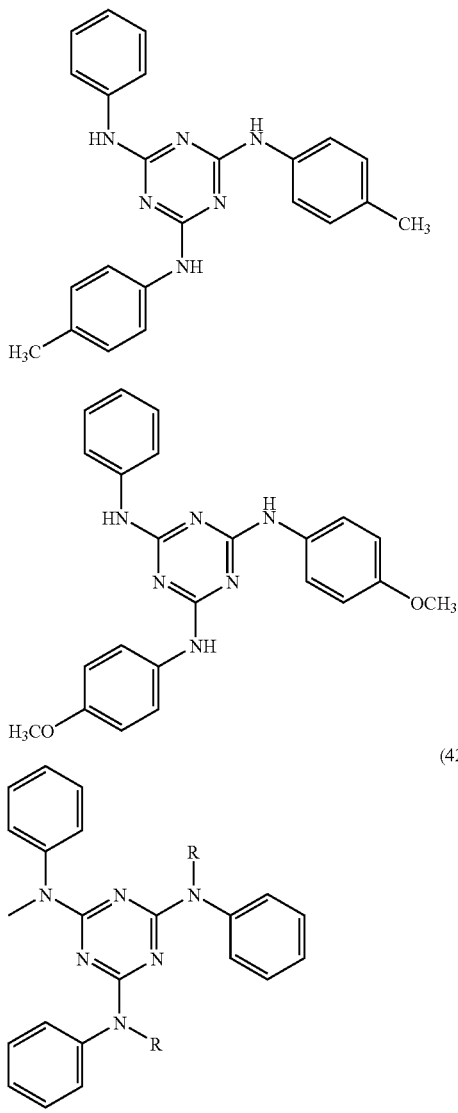
(422)
(423)
(424) - (426)
(424) methyl
(425) phenyl
(426) butyl
(427)
-continued
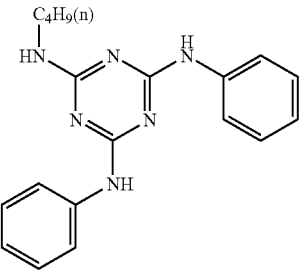
(428)
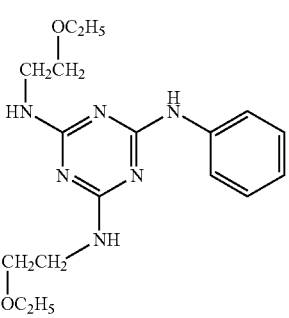
(429)
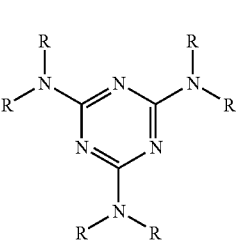
(430) - (437)
(430) methyl
(431) ethyl
(432) butyl
(433) octyl
(434) dodecyl
(435) 2-butoxy-2-ethoxyethyl
(436) benzyl
(437) 4-methoxybenzyl
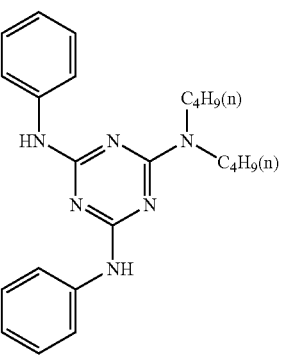
(438)

(439)
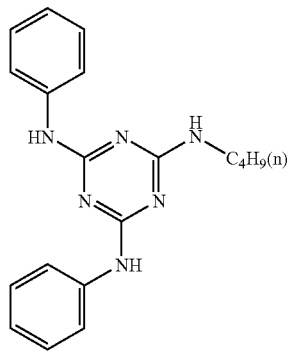
(440)
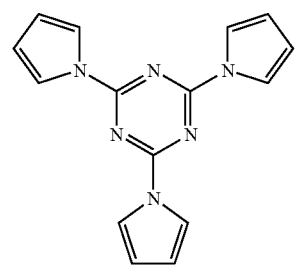
(441)
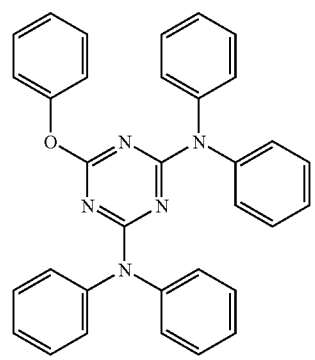
(442)
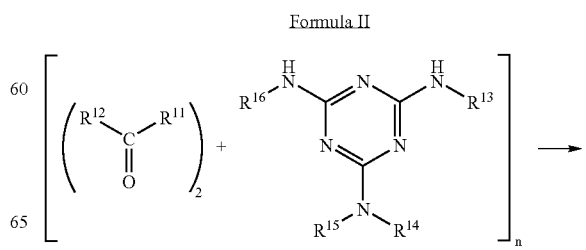
(443)
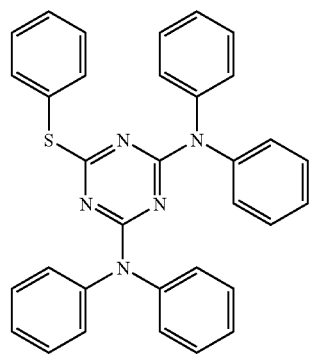
(444)
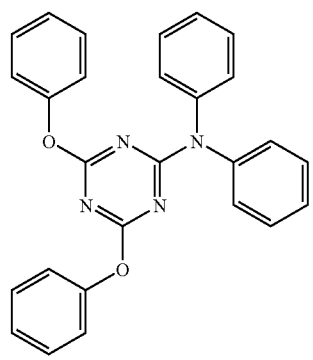
(445)
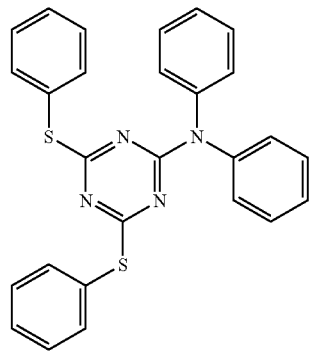
In the present invention, a melamine polymer may be used as a compound with 1,3, and 5-triazine ring. The melamine polymer is preferably prepared through condensation reaction of a melamine compound represented by Formula (II) with a carbonyl compound.
Formula II -continued

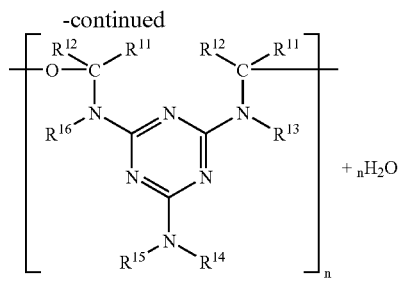

In the above reaction scheme, $R_{11}$, $R^{12}$, $R^{13}$, $R^{14}$, $R^{15}$ and $R^{16}$ each represents a hydrogen atom, an alkyl group, an alkenyl group, an aryl group, or a heterocyclic group.

The above alkyl group, an alkenyl group, an aryl group, heterocyclic groups, and substituents thereof are the same as denoted in Formula (I) above.

The condensation reaction of a melamine compound and carbonyl compounds is carried out in same manner as a conventional synthetic method of a melamine resin (for example, a melamine formaldehyde resin). A commercially available melamine polymer (melamine resin) may also be used.

The molecular weight of the melamine polymer is preferably 2000 to 400,000. Examples of the repeating unit in the melamine polymer will be shown below:

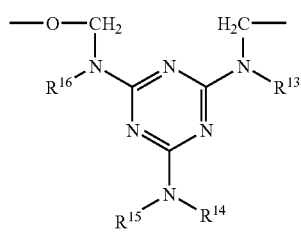

(MP-1)-(MP-50)

MP-1: $R^{13}$, $R^{14}$, $R^{15}$, $R^{16}$:$CH_2OCH_3$
MP-2: $R^{13}$, $R^{14}$, $R^{15}$, $R^{16}$:$CH_2OCH_3$
MP-3: $R^{13}$, $R^{14}$, $R^{15}$, $R^{16}$:$CH_2O$-i-$C_4H_9$
MP-4: $R^{13}$, $R^{14}$, $R^{15}$, $R^{16}$:$CH_2O$-n-$C_4H_9$
MP-5: $R^{13}$, $R^{14}$, $R^{15}$, $R^{16}$:$CH_2NHCOCH=CH_2$
MP-6: $R^{13}$, $R^{14}$, $R^{15}$, $R^{16}$:$CH_2NHCO(CH_2)7CH=CH(CH_2)7CH_3$
MP-7: $R^{13}$, $R^{14}$, $R^{15}$:$CH_2OH$; $R^{16}$:$CH_2OCH_3$
MP-8: $R^{13}$, $R^{14}$, $R^{16}$:$CH_2OH$; $R^{16}$:$CH_2OCH_3$
MP-9: $R^{13}$, $R^{14}$:$CH_2OH$; $R^{15}$, $R^{16}$:$CH_2OCH_3$
MP-10: $R^{13}$, $R^{16}$:$CH_2OH$; $R^{14}$, $R^{15}$:$CH_2OCH_3$
MP-11: $R^{13}$:$CH_2OH$; $R^{14}$, $R^{15}$, $R^{16}$:$CH_2OCH_3$
MP-12: $R^{13}$, $R^{14}$, $R^{16}$:$CH_2OCH_3$; $R^{15}$:$CH_2OH$
MP-13: $R^{13}$, $R^{16}$:$CH_2OCH_3$; $R^{14}$, $R^{15}$:$CH_2OH$
MP-14: $R^{13}$, $R^{14}$, $R^{15}$:$CH_2OH$; $R^{16}$:$CH_2$-i-$C_4H_9$
MP-15: $R^{13}$, $R^{14}$, $R^{16}$:$CH_2OH$; $R^{15}$:$CH_2O$-i-$C_4H_9$
MP-16: $R^{13}$, $R^{14}$:$CH_2OH$; $R^{15}$, $R^{16}$:$CH_2O$-i-$C_4H_9$
MP-17: $R^{13}$, $R^{16}$:$CH_2OH$; $R^{14}$, $R^{15}$:$CH_2O$-i-$C_4H_9$
MP-18: $R^{13}$:$CH_2OH$; $R^{14}$, $R^{15}$, $R^{16}$:$CH_2O$-i-$C_4H_9$
MP-19: $R^{13}$, $R^{14}$, $R^{16}$:$CH_2O$-i-$C_4H_9$; $R^{15}$:$CH_2OH$
MP-20: $R^{13}$, $R^{16}$:$CH_2O$-i-$C_4H_9$; $R^{14}$, $R^{15}$:$CH_2OH$
MP-21: $R^{13}$, $R^{14}$, $R^{15}$:$CH_2OH$; $R^{16}$:$CH_2O$-n-$C_4H_9$
MP-22: $R^{13}$, $R^{14}$, $R^{16}$:$CH_2OH$; $R^{15}$:$CH_2O$-n-$C_4H_9$
MP-23: $R^{13}$, $R^{14}$:$CH_2OH$; $R^{15}$, $R^{16}$:$CH_2O$-n-$C_4H_9$
MP-24: $R^{13}$, $R^{16}$:$CH_2OH$; $R^{14}$, $R^{15}$:$CH_2O$-n-$C_4H_9$
MP-25: $R^{13}$:$CH_2OH$; $R^{14}$, $R^{15}$, $R^{16}$:$CH_2O$-n-$C_4H_9$
MP-26: $R^{13}$, $R^{14}$, $R^{16}$:$CH_2O$-n-$C_4H_9$; $R^{15}$:$CH_2OH$
MP-27: $R^{13}$, $R^{16}$:$CH_2O$-n-$C_4H_9$; $R^{14}$, $R^{15}$:$CH_2OH$
MP-28: $R^{13}$, $R^{14}$:$CH_2OH$; $R^{15}$:$CH_2OCH_3$; $R_{16}$:$CH_2O$-n-$C_4H_9$
MP-29: $R^{13}$, $R^{14}$:$CH_2OH$; $R^{15}$:$CH_2O$-n-$C_4H_9$; $R_{16}$:$CH_2OCH_3$
MP-30: $R^{13}$, $R^{16}$:$CH_2OH$; $R^{14}$:$CH_{20}CH_3$; $R_{15}$:$CH_2O$-n-$C_4H_9$
MP-31: $R^{13}$:$CH_2OH$; $R^{14}$, $R^{15}$:$CH_2OCH_3$; $R^{16}$:$CH_{20}$-n-$C_4H_9$
MP-32: $R^{13}$:$CH_2OH$; $R^{14}$, $R^{16}$:$CH_2OCH_3$; $R_{15}$:$CH_2O$-n-$C_4H_9$
MP-33: $R^{13}$:$CH_2OH$; $R^{14}$:$CH_2OCH_3$; $R^{15}$, $R_{16}$:$CH_2O$-n-$C_4H_9$
MP-34: $R^{13}$:$CH_2OH$; $R^{14}$, $R^{15}$:$CH_2O$-n-$C_4H_9$; $R^{16}$:$CH_2OCH_3$
MP-35: $R^{13}$, $R^{14}$:$CH_2OCH_3$; $R^{15}$:$CH_2OH$; $R_{16}$:$CH_2O$-n-$C_4H_9$
MP-36: $R^{13}$, $R^{16}$:$CH_2OCH_3$; $R^{14}$:$CH_2OH$; $R^{15}$:$CH_2O$-n-$C_4H_9$
MP-37: $R^{13}$:$CH_2OCH_3$; $R^{14}$, $R^{15}$ $CH_2OH$; $R^{16}$:$CH_2O$-n-$C_4H_9$
MP-38: $R^{13}$, $R^{16}$:$CH_2O$-n-$C_4$ $H_9$; $R^{14}$:$CH_2OCH_3$; $R^{15}$:$CH_2OH$
MP-39: $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-40: $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-41: $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-42: $R^{13}$:$CH_2OCH_3$; $R^{14}$ $CH_2OH$; $R^{15}$:$CH_2O$-n-$C_4$ $H_9$; $R^{16}$:$CH_2NHCOCH=CH_2$
MP-43: $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-44: $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
MP-45: $R^{13}$:$CH_2OH$; $R^{14}$:$CH_2OCH_3$; $R^{15}$:$CH_2NHCO)CH_2)7CH=CH(CH_2) 7CH_3$; $R^{16}$:$CH_2NHCOCH=CH_2$
MP-46: $R^{13}$:$CH_2OH$; $R^{14}$:$CH_2OCH_3$; $R^{15}$:$CH_2NHCOCH=CH_2$; $R^{16}$:$CH_2NHCO(CH_2)7CH=CH(CH_2)7CH_3$
MP-47: $R^{13}$:$CH_2OH$; $R^{14}$:$CH_2NHCO(CH_2)7CH=CH(CH_2)7CH_3$; $R^{15}$:$CH_2NHCOCH=CH_2$; $R^{16}$:$CH_2OCH_3$
MP-48: $R^{13}$:$CH_2OCH_3$; $R^{14}$:$CH_2OH$; $R^{15}$:$CH_2NHCO(CH_2)7CH=CH(CH_2) 7CH_3$; $R^{16}$:$CH_2NHCOCH=CH_2$
MP-49: $R^{13}$$CH_2OCH_3$; $R^{14}$:$CH_2OH$; $R^{15}$:$CH_2NHCOCH=CH_2$; $R^{16}$:$CH_2NHCO(CH_2)7CH=CH(CH_2)7CH_3$
MP-50: $R^{13}$:$CH_2NHCO(CH_2)7CH=CH(CH_2)7CH_3$; $R^{14}$:$CH_2OCH_3$; $R^{15}$:$CH_2OH$; $R^{16}$:$CH_2NHCOCH=CH_2$ (MP-51)-(MP-100)

MP-51: $R^{13}$, $R^{14}$, $R^{15}$, $R^{16}$:$CH_2OH$
MP-52: $R^{13}$, $R^{14}$, $R^{15}$, $R^{16}$:$CH_2OCH_3$
MP-53: $R^{13}$, $R^{14}$, $R^{15}$, $R^{16}$:$CH_2O$-i-$C_4H_9$
MP-54: $R^{13}$, $R^{14}$, $R^{15}$, $R^{16}$:$CH_2O$-n-$C_4H_9$
MP-55: $R^{13}$, $R^{14}$, $R^{15}$, $R^{16}$:$CH_2NHCOCH=CH_2$
MP-56: $R^{13}$, $R^{14}$, $R^{15}$, $R^{16}$:$CH_2NHCO(CH_2)7CH=CH(CH_2)7CH_3$
MP-57: $R^{13}$, $R^{14}$, $R^{15}$:$CH_2OH$; $R^{16}$:$CH_2OCH_3$
MP-58: $R^{13}$, $R^{14}$, $R^{16}$:$CH_2OH$; $R^{15}$:$CH_2OCH_3$
MP-59: $R^{13}$, $R^{14}$:$CH_2OH$; $R^{15}$, $R^{16}$:$CH_2OCH_3$
MP-60: $R^{13}$, $R^{16}$:$CH_2OH$; $R^{14}$, $R^{15}$:$CH_2OCH_3$

MP-61:$R^{13}$:$CH_2OH$; $R^{14}$, $R^{15}$, $R^{16}$:$CH_2OCH_3$
MP-62:$R^{13}$, $R^{14}$, $R^{16}$:$CH_2OCH_3$; $R^{15}$:$CH_2OH$
MP-63:$R^{13}$, $R^{16}$:$C_2OCH_3$; $R^{14}$, $R^{15}$:$CH_2OH$
MP-64:$R^{13}$, $R^{14}$, $R^{15}$,$CH_2OH$; $R^{16}$:$CH_2O$-i-$C_4H_9$
MP-65:$R^{13}$, $R^{14}$, $R^{16}$:$CH_2OH$; $R^{15}$:$CH_2O$-i-$C_4H_9$
MP-66:$R^{13}$, $R^{14}$:$CH_2OH$; $R^{15}$, $R^{16}$:$CH_2O$-i-$C_4H_9$
MP-67:$R^{13}$, $R^{16}$:$CH_2OH$; $R^{14}$, $R^{15}$:$CH_2O$-i-$C_4H_9$
MP-68:$R^{13}$:$CH_2OH$; $R^{14}$, $R^{15}$, $R^{16}$:$CH_2O$-i-$C_4H_9$
MP-69:$R^{13}$, $R^{14}$, $R^{16}$:$CH_2O$-i-$C_4H_9$; $R^{15}$:$CH_2OH$
MP-70:$R^{13}$, $R^{16}$:$CH_{20}$-i-$C_4H_9$; $R^{14}$ $R^{15}$:$CH_{20}$H
MP-71:$R^{13}$, $R^{14}$, $R^{15}$:$CH_2OH$; $R^{16}$:$CH_{20}$-n-$C_4H_9$
MP-72:$R^{13}$, $R^{14}$, $R^{16}$:$CH_2OH$; $R^{15}$:$CH_2O$-n-$C_4H_9$
MP-73:$R^{13}$, $R^{14}$:$CH_2OH$; $R^{15}$$R^{16}$:$CH_2O$-n-$C_4H_9$
MP-74:$R^{13}$, $R^{16}$:$CH_2OH$; $R^{14}$, $R^{15}$:$CH_2O$-n-$C_4H_9$
MP-75:$R^{13}$:$CH_2OH$; $R^{14}$, $R^{15}$, $R^{16}$:$CH_2O$-n-$C_4H_9$
MP-76:$R^{13}$, $R^{14}$, $R^{15}$:$CH_2O$-n-$C_4H_9$; $R^{15}$:$CH_2OH$
MP-77:$R^{13}$, $R^{16}$:$CH_2O$-n-$C_4H_9$; $R^{14}$, $R^{15}$:$CH_2OH$
MP-78:$R^{13}$, $R^{14}$:$CH_2OH$; $R^{15}$:$CH_2OCH_3$;$R^{16}$:$CH_2O$-n-$C_4H_9$
MP-79:$R^{13}$, $R^{14}$:$R^{15}$:$CH_2O$; $R^{15}$:$CH_2$-n-$C_4H_9$; $R^{16}$:$CH_2OCH_3$
MP-80:$R^{13}$, $R^{16}$:$CH_2OH$;$R^{14}$:$CH_2OCH_3$;$R^{15}$:$CH_2O$-n-$C_4H_9$
MP-81:$R^{13}$:$CH_2OH$; $R^{14}$; $R^{15}$:$CH_2OCH_3$; $R^{16}$:$CH_2O$-n-$C_4H_9$
MP-82:$R^{13}$:$CH_2OH$; $R^{14}$, $R^{16}$:$CH_2OCH_3$;$R^{15}$:$CH_2O$-n-$C_4H_9$
MP-83:$R^{13}$:$CH_2OH$; $R^{14}$:$CH_2OCH_3$; $R^{15}$, $R^{16}$:$CH_2O$-n-$C_4H_9$
MP-84:$R^{13}$:$CH_2OH$; $R^{14}$, $R^{15}$:$CH_2O$-n-$C_4H_9$; $R^{16}$:$CH_2OCH_3$
MP-85:$R^{13}$, $R^{14}$:$CH_2OCH_3$; $R^{15}$:$CH_2OH$;$R^{16}$:$CH_2O$-n-$C_4H_9$
MP-86:$R^{13}$, $R^{16}$:$CH_2OCH_3$;$R^{14}$:$CH_2OH$;$R^{15}$:$CH_2O$-n-$C_4H_9$
MP-87:$R^{13}$:$CH_2OCH_3$; $R^{14}$, $R^{15}$:$CH_2OH$;$R^{16}$:$CH_2O$-n-$C_4H_9$
MP-88:$R^{13}$, $R^{16}$:$CH_2O$-n-$C_4H_9$; $R^{14}$:$CH_2OCH_3$; $R^{15}$:$CH_2OH$
MP-89:$R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-90:$R^{13}$:$CH_2$$R^{14}$:$CH_2OCH_3$; $R^{15}$:$CH_2NHCOCH=CH_2$; $R^{16}$:$CH_2O$-n-$C_4H_9$
MP-91:$R^{13}$$CH_2OH$; $R^{14}$:$CH_2O$-n-$C_4H_9$; $R^{15}$:$CH_2NHCOCH=CH_2$; $R^{16}$:$CH_2OCH_3$
MP-92:$R^{13}$:$CH_2OCH_3$;$R^{14}$:$CH_2OH$; $CH_2OH$; $R^{15}$:$CH_2O$-n-$C_4H_9$; $R^{16}$:$CH_2NHCOCH=CH_2$
MP-93:$R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-94:$R^{13}$:$CH_2O$-n-$C_4H_9$; $R^{14}$:$CH_2OCH_3$; $R^{15}$:$CH_2OH$; $R^6$:$CH_2NHCOCH=CH_2$
MP-95:$R^{13}$:$CH_2OH$; $R^{14}$:$CH_2OCH_3$; $R^{15}$:$CH_2NHCO(CH_2)7CH=CH(CH_2) 7CH_3$; $R^{16}$:$CH_2NHCOCH=CH_2$
MP-96:$R^{13}$:$CH_2OH$; $R^{14}$:$CH_2OCH_3$; $R^{15}$:$CH_2NHCOCH=CH_2$; $R^{16}$:$CH_2NHCO(CH_2)7CH=CH(CH_2)7CH_3$
MP-97:$R^{13}$:$CH_2OH$; $R^{14}$:$CH_2NHCO(CH_2)7CH=CH(CH_2)_7 CH_3$; $R^{15}$:$CH_2NHCOCH=CH_2$; $R^{16}$:$CH_2OCH_3$
MP-98:$R^{13}$:$CH_2OCH_3$; $R^{14}$:$CH_2OH$; $R^{15}$:$CH_2NHCO(CH_2) 7CH=CH(CH_2) 7CH_3$; $R^{16}$:$CH_2NHCOCH=CH_2$
MP-99:$R^{13}$:$CH_2OCH_3$; $R^{14}$:$CH_2OH$; $R^{15}$:$CH_2NHCOCH=CH_2$; $R^{16}$:$CH_2NHCO(CH_2)7CH=CH(CH_2)7CH_3$
MP-100:$R^{13}$:$CH_2NHCO(CH_2)7CH=CH(CH_2)7CH_3$; $R^{14}$:$CH_2OCH_3$;$R^{15}$:$CH_2OH$;$R^{16}$:$CH_2NHCOCH=CH_2$

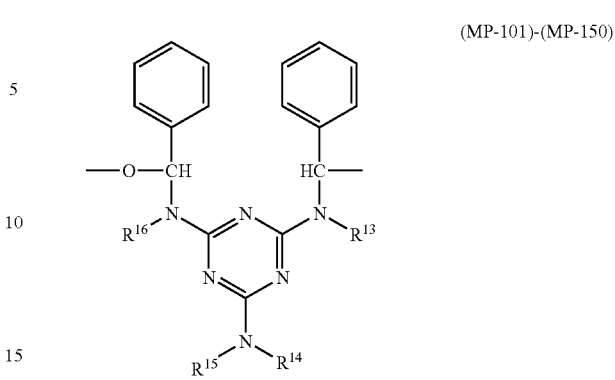

(MP-101)-(MP-150)

MP-101:$R^{13}$, $R^{14}$, $R^{15}$, $R^{16}$:$CH_2OH$
MP-102:$R^{13}$, $R^{14}$, $R^{15}$, $R^{16}$:$CH_2OCH_3$
MP-103:$R^{13}$, $R^{14}$, $R^{15}$, $R^{16}$:$CH_2O$-i-$C_4H_9$
MP-104:$R^{13}$, $R^{14}$, $R^{15}$, $R^{16}$:$CH_2O$-n-$C_4H_9$
MP-105:$R^{13}$, $R^{14}$, $R^{15}$, $R^{16}$:$CH_2NHCOCH=CH_2$
MP-106:$R^{13}$, $R^{14}$, $R^{15}$, $R^{16}$:$CH_2NHCO(CH_2)7CH=CH(CH_2)7CH_3$
MP-107:$R^{13}$, $R^{14}$, $R^{15}$:$CH_2OH$; $R^{16}$:$CH_2OCH_3$
MP-108:$R^{13}$, $R^{14}$, $R^{16}$:$CH_2OH$; $R^{15}$:$CH_2OCH_3$
MP-109:$R^{13}$, $R^{14}$:$CH_2OH$; $R^{15}$, $R^{16}$:$CH_2OCH_3$
MP-110:$R^{13}$, $R^{16}$:$CH_2$; $R^{14}$, $R^{15}$:$CH_2OCH_3$
MP-111:$R^{13}$:$CH_2OH$; $R^{14}$, $R^{15}$, $R^{16}$:$CH_2OCH_3$
MP-112:$R^{13}$, $R^{14}$, $R^{16}$:$CH_2OCH_3$; $R^{15}$:$CH_2OH$
MP-113:$R^{13}$, $R^{16}$:$CH_2OCH_3$; $R^{14}$, $R^{15}$:$CH_2OH$
MP-114:$R^{13}$, $R^{14}$, $R^{15}$:$CH_2OH$; $R^{16}$:$CH_2O$-i-$C_4H_9$
MP-115:$R^{13}$, $R^{14}$, $R^{16}$:$CH_2OH$; $R^{15}$:$CH_2O$-i-$C_4H_9$
MP-116:$R^{13}$, $R^{14}$:$CH_2OH$; $R^{15}$, $R^{16}$:$CH_2O$-i-$C_4H_9$
MP-117:$R^{13}$, $R^{16}$:$CH_2OH$; $R^{14}$, $R^{15}$:$CH_2O$-i-$C_4H_9$
MP-118:$R^{13}$:$CH_2OH$; $R^{14}$, $R^{15}$, $R^{16}$:$CH_2O$-i-$C_4H_9$
MP-119:$R^{13}$, $R^{14}$, $R^{16}$:$CH_2O$-i-$C_4H_9$; $R^{15}$:$CH_2OH$
MP-120:$R^{13}$, $R^{16}$:$CH_2$-i-$C_4H_9$; $R^{14}$, $R^{15}$:$CH_2OH$
MP-121:$R^{13}$, $R^{14}$, $R^{15}$:$CH_2OH$; $R^{16}$:$CH_2O$-n-$C_4H_9$
MP-122:$R^{13}$, $R^{14}$, $R^{16}$:$CH_2OH$; $R^{15}$:$CH_2O$-n-$C_4H_9$
MP-123:$R^{13}$, $R^{14}$:$CH_2OH$; $R^{15}$, $R^{16}$:$CH_2O$-n-$C_4H_9$
MP-124:$R^{13}$, $R^{16}$:$CH_2OH$; $R^{14}$, $R^{15}$:$CH_2O$-n-$C_4H_9$
MP-125:$R^{13}$:$CH_2OH$; $R^{14}$, $R^{15}$, $R^{16}$:$CH_2O$-n-$C_4H_9$
MP-126:$R^{13}$, $R^{14}$, $R^{16}$:$CH_2O$-n-$C_4H_9$; $R^{15}$:$CH_2OH$
MP-127:$R^{13}$, $R^{16}$:$CH_2O$-n-$C_4H_9$; $R^{14}$, $R^{15}$:$CH_2OH$
MP-128:$R^{13}$, $R^{14}$:$CH_2OH$; $R^{15}$:$CH_2OCH_3$; $R^{16}$:$CH_2O$-n-$C_4H_9$
MP-129:$R^{13}$, $R^{14}$:$CH_2OH$; $R^{15}$:$CH_2O$-n-$C_4H_9$; $R^{16}$:$CH_2OCH_3$
MP-130:$R^{13}$, $R^{16}$:$CH_2OH$; $R^{14}$:$CH_2OCH_3$; $R^{15}$:$CH_2O$-n-$C_4H_9$
MP-131:$R^{13}$:$CH_2OH$; $R^{14}$, $R^{15}$:$CH_2OCH_3$; $R^{16}$:$CH_2O$-n-$C_4H_9$
MP-132:$R^{13}$:$CH_2OH$; $R^{14}$, $R^{16}$:$CH_2OCH_3$; $R^{15}$:$CH_2O$-n-$C_4H_9$
MP-133:$R^{13}$:$CH_2OH$; $R^{14}$$CH_2OCH_3$; $R^{15}$, $R^{16}$:$CH_2O$-n-$C_4H_9$
MP-134:$R^{13}$:$CH_2OH$; $R^{14}$, $R^{15}$:$CH_2O$-n-$C_4H_9$; $R^{16}$:$CH_2OCH_3$
MP-135:$R^{13}$, $R^{14}$:$CH_2OCH_3$; $R^{15}$:$CH_2OH$; $R^{16}$:$CH_2O$-n—$C_4H_9$
MP-136:$R^{13}$, $R^{16}$:$CH_2OCH_3$; $R^{14}$:$CH_2OH$; $R^{15}$:$CH_2O$-n-$C_4H_9$
MP-137:$R^{13}$:$CH_2OCH_3$; $R^{14}$, $R^{15}$:$CH_2OH$; $R^{16}$:$CH_2O$-n-$C_4H_9$
MP-138:$R^{13}$, $R^{16}$:$CH_2O$-n-$C_4H_9$; $R^{14}$:$CH_2OCH_3$; $R^{15}$:$CH_2OH$

MP-139:$R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-140:$R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-141:$R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-142:$R^{13}$:$CH_2OCH_3$; $R^{14}$:$CH_2OH$; $R^{15}$:$CH_2O$-n-$C_4H_9$; $R^{16}$:$CH_2NHCOCH=CH_2$
MP-143:$R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-144:$R^{13}$:$CH_2O$-n-$C_4H_9$; $R^{14}$:$CH_2OCH_3$; $R^{15}$:$CH_2OH$; $R^{16}$:$CH_2NHCOCH=CH_2$
MP-145:$R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
MP-146:$R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
MP-147:$R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
MP-148:$R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
MP-149:$R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$
MP-150:$R^{13}$:$CH_2NHCO(CH_2)_7CH=CH(CH_2)_7CH_3$; $R^{14}$:$CH_2CH_3$; $R^{15}$:$CH_2OH$; $R^{16}$:$CH_2NHCOCH=CH_2$

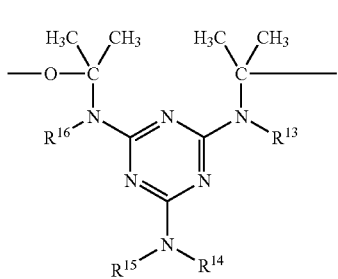

(MP-151)-(MP-200)

MP-151:$R^{13}$, $R^{14}$, $R^{15}$, $R^{16}$:$CH_2OH$
MP-152:$R^{13}$, $R^{14}$, $R^{15}$, $R^{16}$:$CH_2OCH_3$
MP-153:$R^{13}$, $R^{14}$, $R^{15}$, $R^{16}$:$CH_2O$-i-$C_4H_9$
MP-154:$R^{13}$, $R^{14}$, $R^{15}$, $R^{16}$:$CH_2O$-n-$C_4H_9$
MP-155:$R^{13}$, $R^{14}$, $R^{15}$, $R^{16}$:$CH_2NHCOCH=CH_2$
MP-156:$R^{13}$, $R^{14}$, $R^{15}$, $R^{16}$:$CH_2NHCO(CH_2)_7CH=CH(CH_2)_7CH_3$
MP-157:$R^{13}$, $R^{14}$, $R^{15}$:$CH_2OH$; $R^{16}$:$CH_2OCH_3$
MP-158:$R^{13}$, $R^{14}$, $R^{16}$:$CH_2OH$; $R^{15}$:$CH_2OCH_3$
MP-159:$R^{13}$, $R^{14}$:$CH_2OH$; $R^{15}$, $R^{16}$:$CH_2OCH_3$
MP-160:$R^{13}$, $R^{16}$:$CH_2OH$; $R^{14}$, $R^{15}$:$CH_2OCH_3$
MP-161:$R^{13}$:$CH_2OH$; $R^{14}$, $R^{15}$, $R^{16}$:$CH_2OCH_3$
MP-162:$R^{13}$, $R^{14}$, $R^{16}$:$CH_2OCH_3$; $R^{15}$:$CH_2OH$
MP-163:$R^{13}$, $R^{16}$:$CH_2OCH_3$; $R^{14}$, $R^{15}$:$CH_2OH$
MP-164:$R^{13}$, $R^{14}$, $R^{15}$:$CH_2OH$; $R^{16}$:$CH_2O$-i-$C_4H_9$
MP-165:$R^{13}$, $R^{14}$, $R^{16}$:$CH_2OH$; $R^{15}$:$CH_2O$-i-$C_4H_9$
MP-166:$R^{13}$, $R^{14}$:$CH_2OH$; $R^{15}$, $R^{16}$:$CH_2O$-i-$C_4H_9$
MP-167:$R^{13}$, $R^{16}$:$CH_2H$; $R^{14}$, $R^{15}$:$CH_2O$-i-$C_4H_9$
MP-168:$R^{13}$:$CH_2OH$; $R^{14}$, $R^{15}$, $R^{16}$:$CH_2O$-i-$C_4H_9$
MP-169:$R^{13}$, $R^{14}$, $R^{16}$:$CH_2O$-i-$C_4H_9$; $R^{15}$:$CH_2OH$
MP-170:$R^{13}$, $R^{16}$:$CH_2O$-i-$C_4H_9$; $R^{14}$, $R^{15}$:$CH_2OH$
MP-171:$R^{13}$, $R^{14}$, $R^{15}$:$CH_2OH$; $R^{16}$:$CH_2O$-n-$C_4H_9$
MP-172:$R^{13}$, $R^{14}$, $R^{16}$:$CH_2H$; $R^{15}$:$CH_2O$-n-$C_4H_9$
MP-173:$R^{13}$, $R^{14}$:$CH_2OH$; $R^{15}$, $R^{16}$:$CH_2O$-n-$C_4H_9$
MP-174:$R^{13}$, $R^{16}$:$CH_2OH$; $R^{14}$, $R^{15}$:$CH_2O$-n-$C_4H_9$
MP-175:$R^{13}$:$CH_2OH$; $R^{14}$, $R^{15}$, $R^{16}$:$CH_2O$-n-$C_4H_9$
MP-176:$R^{13}$, $R^{14}$, $R^{16}$:$CH_2O$-n-$C_4H_9$; $R^{15}$:$CH_2OH$
MP-177:$R^{13}$, $R^{16}$:$CH_2O$-n-$C_4H_9$; $R^{14}$, $R^{15}$:$CH_2OH$
MP-178:$R^{13}$, $R^{14}$:$CH_2OH$; $R^{15}$:$CH_2OCH_3$; $R^{16}$:$CH_2O$-n-$C_4H_9$
MP-179:$R^{13}$, $R^{14}$:$CH_2OH$; $R^{15}$:$CH_2O$-n-$C_4H_9$;$CH_2OCH_3$
MP-180:$R^{13}$, $R^{16}$:$CH_2OH$; $R^{14}$:$CH_2OCH_3$; $R^{15}$:$CH_2O$-n-$C_4H_9$
MP-181:$R^{13}$:$CH_2OH$; $R^{14}$, $R^{15}$:$CH_2OCH_3$; $R^{16}$:$CH_2O$-n-$C_4H_9$
MP-182:$R^{13}$:$CH_2OH$; $R^{14}$, $R^{16}$:$CH_2OCH_3$; $R^{15}$:$CH_2O$-n-$C_4H_9$
MP-183:$R^{13}$:$CH_2OH$; $R^{14}$:$CH_2OCH_3$; $R^{15}$, $R^{16}$:$CH_2O$-n-$C_4H_9$
MP-184:$R^{13}$:$CH_2OH$; $R^{14}$, $R^{15}$:$CH_2O$-n-$C_4H_9$; $R^{16}$:$CH_2OCH_3$
MP-185:$R^{13}$, $R^{14}$:$CH_2OCH_3$; $R^{15}$:$CH_2OH$; $R^{16}$:$CH_2O$-n-$C_4H_9$
MP-186:$R^{13}$, $R^{16}$:$CH_2OCH_3$; $R^{14}$:$CH_2OH$; $R^{15}$:$CH_2O$-n-$C_4H_9$
MP-187:$R^{13}$:$CH_2OCH_3$; $R^{14}$, $R^{15}$:$CH_2OH$; $R^{16}$:$CH_2O$-n-$C_4H_9$
MP-188:$R^{13}$, $R^{16}$:$CH_2O$-n-$C_4H_9$; $R^{14}$:$CH_2OCH_3$; $R^{15}$:$CH_2OH$
MP-189:$R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-190:$R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-191:$R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-192:$R^{13}$:$CH_2OCH_3$; $R^{14}$:$CH_2OH$; $R^{15}$:$CH_2O$-n-$C_4H_9$; $R^{16}$:$CH_2NHCOCH=CH_2$
MP-193:$R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-194:$R^{13}$:$CH_2O$-n-$C_4H_9$; $R^{14}$:$CH_2OCH_3$; $R^{15}$:$CH_2OH$; $R^{16}$:$CH_2NHCOCH=CH_2$
MP-195:$R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
MP-196:$R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
MP-197:$R^{13}$:$CH_2OH$; $R^{14}$:$CH_2NHCO(CH_2)_7CH_3$; $R^{15}$:$CH_2NHCOCH=CH_2$; $R^{16}$:$CH_2OCH_3$
MP-198:$R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
MP-199:$R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$
MP-200:$R^{13}$:$CH_2NHCO(CH_2)_7CH=CH(CH_2)_7CH_3$; $R^{14}$:$CH_2OCH_3$; $R^{15}$:$CH_2OH$; $R^{16}$:$CH_2NHCOCH=CH_2$

In the invention, a copolymer having two or more kinds of the above repeating unit can be used. Two or more kinds of a homopolymer or a copolymer can be also used.

A compound having two or more kinds of 1,3,5-triazine rings may be used and two or more discotic compounds (for example, a compound having a 1,3,5-triazine ring and a compound having a porphyrin moiety) are also usable.

A triazine compound represented by formula (I) disclosed in Japanese Patent O.P.I. Publication Nos. 2001-23561 is preferably used in the cellulose ester film of the invention.

The cellulose ester film of the invention preferably contains two or more kinds of UV absorbents. As the UV absorbents, polymeric UV absorbents are preferably used, and polymeric UV absorbents disclosed in Japanese Patent O.P.I. Publication No. 6-148430 is more preferably used.

The UV absorbents may be added to a dope in the form of a solid or in the form of a solution in which the UV absorbents are dissolved in an alcohol such as methanol, ethanol, or butanol, an organic solvent such as methylene chloride, methyl acetate, acetone or dioxolane, or their mixture. UV absorbents, which are insoluble in an organic solvent, are dispersed in a mixture of an organic solvent and cellulose ester employing a dissolver or a sand mill, and added to a dope.

The UV absorbent content of the cellulose ester film is different due to kinds or conditions used of the UV absorbent. The UV absorbent content of the cellulose ester film of the invention is preferably 0.5 to 10% by weight, more preferably 0.4 to 4% by weight, and most preferably 0.6 to 2% by weight.

The cellulose ester film may contain a blue dye in order to adjust hue of the film. Preferred dye is an anthraquinone dye. The anthraquinone dye may have a substituent at any of 1 through 8 positions of the anthraquinone nucleus. Preferred examples of the substituent include an anilino group, a hydroxyl group, an amino group, a nitro group and a hydrogen atom. The dye content of the cellulose ester film is 0.1 to 1.000 μg/m², and preferably from 10 to 100 μg/m², in maintaining transparency of the film.

The cellulose ester film may contain a fluorescent brightening agent in order to adjust hue of the film. The blue dye or fluorescent brightening agent are preferably added to the UV absorbent solution, in adjusting easily hue of the film.

The plasticizers used in the invention include a phosphate plasticizer, a phthalate plasticizer, a glycolic acid ester, and citric acid ester plasticizer, but the invention is not limited thereto. Examples of the plasticizer include a phosphate plasticizer such as triphenyl phosphate, tricresyl phosphate, cresyldiphenyl phosphate, octyldiphenyl phosphate, diphenylbiphenyl phosphate, trioctyl phosphate, or tributyl phosphate; a phthalate plasticizer such as diethyl phthalate, dimethoxyethyl phthalate, dimethyl phthalate, dioctyl phthalate, dibutyl phthalate, di-2-ethylhexyl phthalate, butylbenzyl phthalate or dibenzyl phthalate; a glycolic acid ester such as butyl phthalyl butyl glycolate, ethyl phthalyl ethyl glycolate or methyl phthalyl ethyl glycolate; and a citric acid ester plasticizer such as triethyl citrate, tri-n-butyl citrate, acetyltriethyl citrate, acetyl-tri-n-butyl citrate, or acetyl-tri-n-(2-ethylhexyl) citrate.

These plasticizers may be used singly. These plasticizers are optionally used as a mixture of two or more kinds thereof. The plasticizer content of the cellulose ester film is preferably 1 to 30% by weight, more preferably 2 to 25% by weight, still more preferably 2 to 25% by weight, and most preferably 8 to 15% by weight.

The cellulose ester film of the invention may contain an additive having the same effect as the plasticizer in addition to the plasticizer. These additives can provide the effects of the invention which the plasticizer provides as long as they are lower molecular weight organic compounds capable of plasticizing the cellulose ester film. These organic compounds are not added to the cellulose ester film for the purpose of plasticizing the film, but can provide the same effects as the plasticizer depending upon the addition amount thereof.

Next, the aliphatic polyhydric alcohol ester preferably used in the invention will be explained in detail. The aliphatic polyhydric alcohol ester herein referred to implies an ester of an aliphatic polyhydric alcohol and one or more monocarboxylic acids.

(Aliphatic Polyhydric Alcohol)

The aliphatic polyhydric alcohol used in the invention implies an alcohol having two or more hydroxyl groups, which is represented by the following formula (A):

$$R_1\text{—}(OH)_n \quad \text{Formula (A)}$$

wherein $R_1$ represents an n-valent aliphatic organic group, and n represents an integer of not less than 2.

Examples of the n-valent aliphatic organic group include an alkylene group (for example, methylene, ethylene, trimethylene, tetramethylene, etc.), an alkenylene group (for example, ethenylene, etc.), an alkynylene group (for example, ethynylene, etc.), a cycloalkylene group (for example, 1,4-cyclohexanediyl, etc.), and an alkanetriyl group (for example, 1,2,3-propanetriyl, etc.). The n-valent organic groups described above include those having a substituent (for example, a hydroxyl group, an alkyl group, a halogen atom, etc.).

"n" represents an integer of preferably from 2 to 20.

Preferred examples of the polyhydric alcohol include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,3,4-butanetriol, 1,5-pentanediol, 1,6-hexanediol, hexanetriol, galactitol, mannitol, 3-methylpentane-1,3,5-triol, pinacol, sorbitol, trimethylolpropane, trimetylolethane, and xylitol. Triethylene glycol, tetraethylene glycol, dipropylene glycol, tripropylene glycol, sorbitol, trimethylolpropane, and xylitol are especially preferable.

(Monocarboxylic Acid)

The monocarboxylic acids used for the preparation of the polyhydric alcohol ester in the invention are not specifically limited. The monocarboxylic acids include an aliphatic monocarboxylic acid, an alicyclic monocarboxylic acid, and an aromatic monocarboxylic acid, and an alicyclic monocarboxylic acid and an aromatic monocarboxylic acid are preferable in improving water vapor transmission rate and a retention property.

Preferred examples of the monocarboxylic acid include the compounds described later, but the present invention is not limited thereto.

The aliphatic monocarboxylic acid is a straight chained or branched fatty acid having a carbon atom number of preferably from 1 to 32, more preferably from 1 to 20, and most preferably from 1 to 10. Acetic acid is preferable in providing increased compatibility with cellulose ester, and a combined use of acetic acid and another monocarboxylic acid is more preferable.

Preferred examples of the aliphatic monocarboxylic acid include a saturated fatty acid such as acetic acid, propionic acid, butyric acid, valeric acid, caproic acid, enanthic acid, pelargonic acid, capric acid, 2-ethyl-hexane carboxylic acid, undecanoic acid, lauric acid, tridecanoic acid, myristic acid, pentadecanoic acid, palmitic acid, heptadecanoic acid, stearic acid, nonadecanoic acid, arachic acid, behenic acid, lignoceric acid, cerotic acid, heptacosanoic acid, montanic acid, melissic acid or lacceric acid; and an unsaturated fatty acid such as undecylenic acid, oleic acid, sorbic acid, linolic acid, linolenic acid or arachidonic acid. These include those having a substituent.

Preferred examples of the alicyclic monocarboxylic acid include cyclopentane carboxylic acid, cyclohexane carboxylic acid, cyclooctane carboxylic acid, and their derivatives.

Preferred examples of the aromatic monocarboxylic acid include benzoic acid, an alkyl-substituted benzoic acid such as toluic acid, an aromatic monocarboxylic acid having two or more benzene rings such as biphenyl carboxylic acid, naphthalene carboxylic acid, or tetrarin carboxylic acid and their derivatives. Benzoic acid is especially preferable.

(Polyhydric Alcohol Ester)

The molecular weight of the polyhydric alcohol ester used in the invention is not specifically limited, but is preferably from 300 to 1500, and more preferably from 350 to 750. The polyhydric alcohol ester with higher molecular weight is preferable in the retention property, and the polyhydric alcohol ester with lower molecular weight is preferable in water vapor transmission rate and its compatibility with cellulose ester.

The monocarboxylic acid for the preparation of the polyhydric alcohol ester in the invention may be used singly or as a mixture or two or more kinds thereof. All the hydroxy groups of the polyhydric alcohol may be esterified or a part of the hydroxy groups of the polyhydric alcohol may be esterified to remain a free hydroxyl group.

It is preferred that the polyhydric alcohol ester in the invention preferably has an aromatic ring and/or a cycloalkyl ring in the molecule. It is more preferred that the polyhydric alcohol ester in the invention has a total number of the aromatic ring and/or the cycloalkyl ring of not less than 3, that is, the polyhydric alcohol ester in the invention is one having three or more aromatic rings, one having three or more cycloalkyl rings, or one having three or more of aromatic rings and cycloalkyl rings. Herein, with respect to the aromatic ring, one condensed aromatic ring (for example, a naphthalene ring, or an anthracene ring) is one aromatic ring.

Examples of the polyhydric alcohol ester in the invention will be exemplified below.

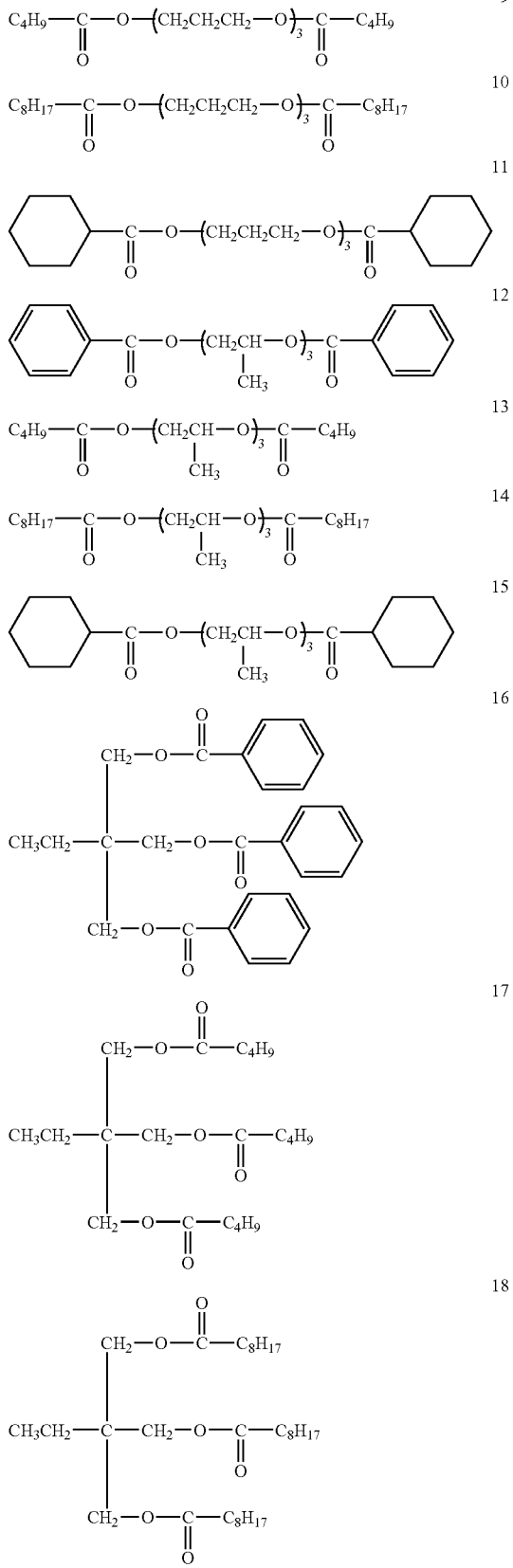

19
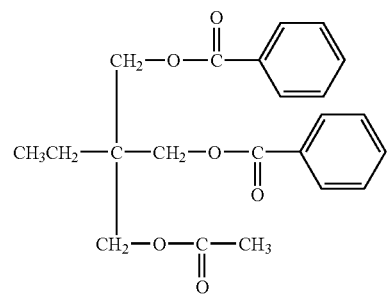
20
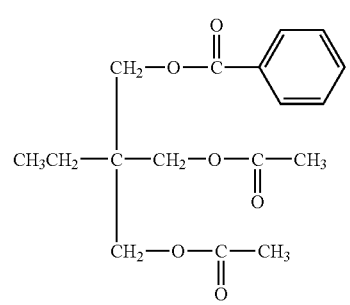
21
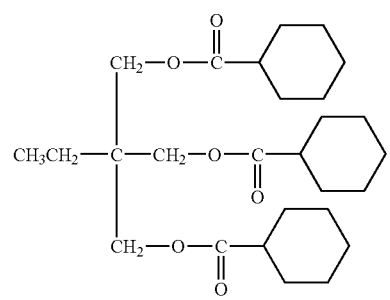
22
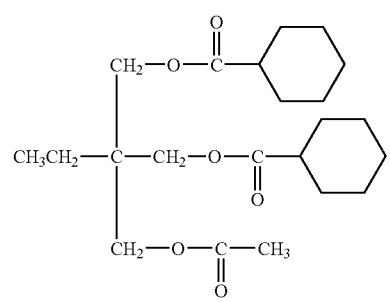
23
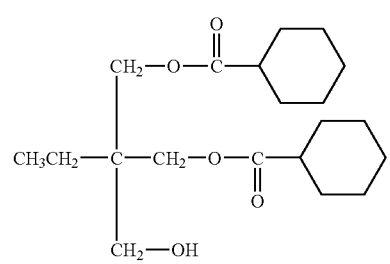
24
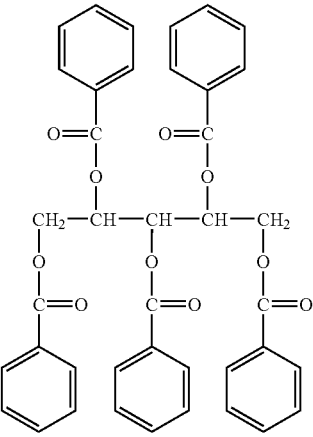
25
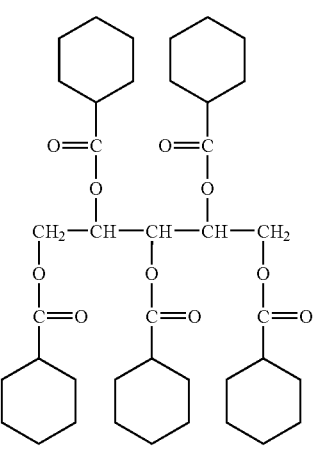
26
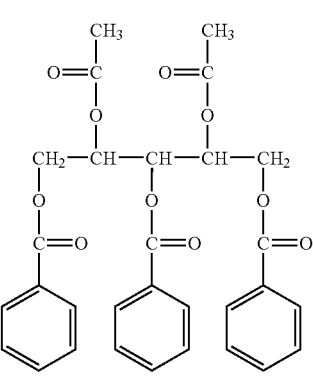
27
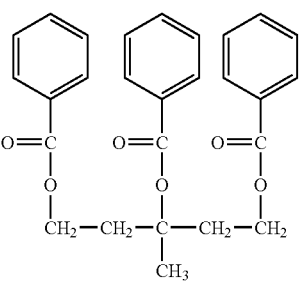

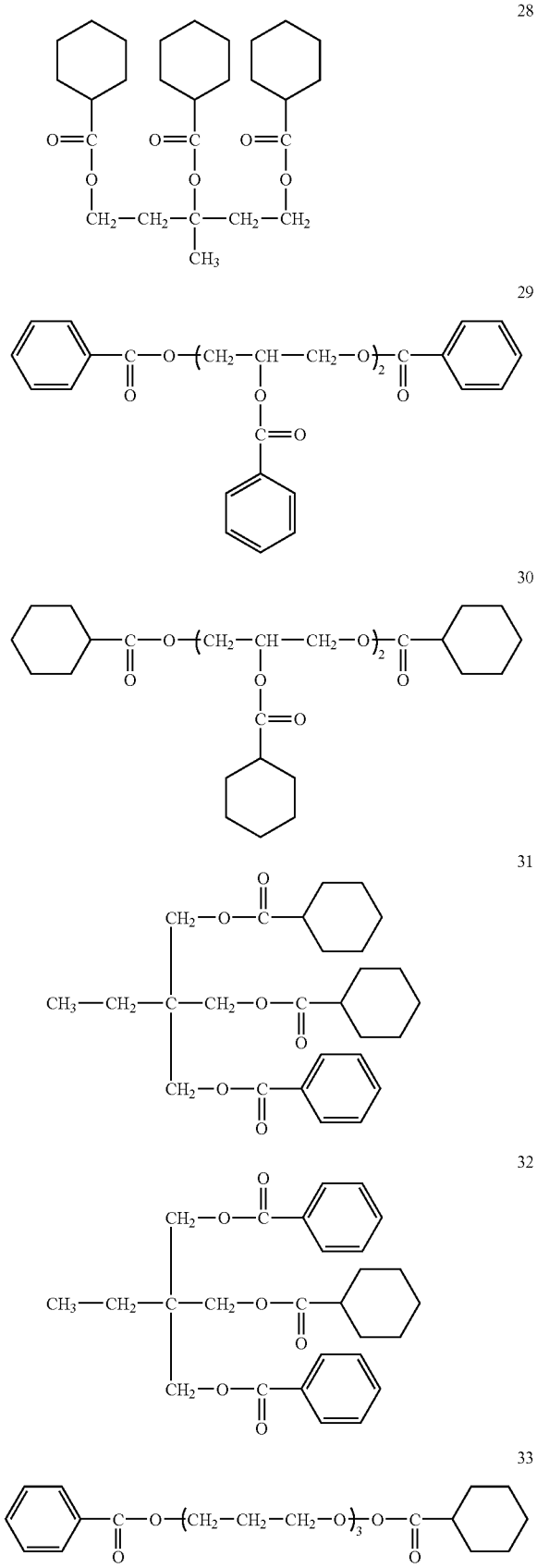

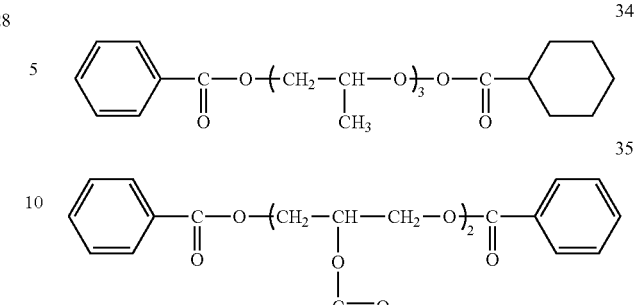

The addition amount of the polyhydric alcohol ester in the cellulose ester is preferably from 3 to 30% by weight, more preferably from 5 to 25% by weight, and most preferably from 5 to 20% by weight, based on the weight of cellulose ester.

(Manufacturing Method of Cellulose Ester Film)

Next, a manufacturing method of cellulose ester film of the invention will be explained.

The preferable film forming process for manufacturing the cellulose ester film of the invention comprises the steps of a dissolution process, a casting process, a solvent evaporation process, a peeling process, a drying process, and a winding process. Each process will be explained below.

(Dissolution Process)

The dissolution process is one in which cellulose ester in the flake form is dissolved, while stirring, in organic solvents mainly comprised of good solvents described later for the cellulose ester in a dissolution vessel to prepare a dope.

In the invention, the solid content of the dope is preferably not less than 15% by weight, and more preferably from 18 to 35% by weight.

The solid content of the dope is preferably not more than 35% by weight, since a too high solid content of the dope results in too high viscosity, and may form a shark skin surface in the cast web to lower flatness of the finished cellulose ester film.

The viscosity of the dope is preferably adjusted to from 10 to 50 Pa·s.

In order to carry out said dissolution, there are various methods such as a method in which dissolution is carried out at a normal atmospheric pressure, a method in which dissolution is carried out at a temperature lower than the boiling point of the preferable organic solvent (i.e., a good solvent), a method in which dissolution is carried out at a temperature higher than the boiling point of the good solvent under increased pressure, a cooling dissolution method, a method in which dissolution is carried out at a high pressure, and the like. A method in which dissolution is carried out at a temperature higher than the boiling point of the good solvent, for example, 40.4 to 120° C. and at increased pressure, for example, 0.11 to 1.50 Mpa, under the pressure of which the good solvent is not evaporated, makes it possible to carry out a rapid dissolution and to minimize occurrence of foams in the dope.

The cellulose ester used in the invention is preferably a lower fatty acid ester of cellulose.

The lower fatty acid used in preparation of the lower fatty acid ester of cellulose implies a fatty acid having a carbon atom number of not more than 6. Examples of the lower fatty acid ester of cellulose include cellulose acetate, cellulose propionate, cellulose butyrate, and a mixed fatty acid ester of cellulose such as cellulose acetate propionate, or cellulose acetate butyrate as disclosed in Japanese Patent O.P.I. Publication Nos. 10-45804 and 8-231761 and U.S. Pat. No. 2,319,052.

The acyl substitution degree of the cellulose ester can be measured according to ASTM-D-817-96.

Among the cellulose esters, cellulose acetate and cellulose acetate propionate are preferably used. The polymerization degree of the cellulose ester used in cellulose ester film of the invention is preferably from 250 to 400, in view of strength of the film.

The total acyl substitution degree of the cellulose ester used in the cellulose ester film of the invention is preferably 2.5 to 3.0, and more preferably 2.55 to 2.85. The total acyl substitution degree of not less than 2.55 is preferable in increasing mechanical strength of the cellulose ester film comprising the compound represented by formula (1), and the total acyl substitution degree of not more than 2.85 is preferable in increasing dissolution of the cellulose ester in an organic solvent, and in minimizing occurrence of foams in the cellulose ester dope.

When the cellulose ester film is used as a polarizing plate protective film, the cellulose ester used is preferably cellulose acetate, and in the cellulose acetate, a molecular weight distribution represented by a ratio Mw/Mn of the weight average molecular weight Mw to the number average molecular weight Mn is preferably from 1.8 to 3.0.

The above range of the molecular weight distribution is preferred in processability, dimensional stability or flatness of the cellulose acetate film. The number average molecular weight of the cellulose acetate is preferably from 90,000 to 180,000, more preferably from 120,000 to 180,000, and still more preferably from 150,000 to 180,000. The above range of the number average molecular weight is preferred in productivity or flatness of cellulose acetate film.

The number average molecular weight or molecular weight distribution of cellulose ester can be determined employing high speed liquid chromatography. The number average molecular weight (Mn) and the weight average molecular weight (Mw) are measured employing high speed liquid chromatography, and the Mw/Mn ratio is determined.

The measurement conditions are shown hereunder.
Solvent: methylene chloride
Column: Three columns of Shodex K806, K805, and K803G (manufactured by Showa Denko Co., Ltd.) were employed in series.
Column temperature: 25° C.
Sample concentration: 0.1% by weight
Detector: RI Model 504 (manufactured by GL Science Co., Ltd.)
Pump: L6000 (manufactured by Hitachi, Ltd.)
Flow rate: 1.0 ml/minute
Calibration curve: Standard Polystyrene STK standard polystyrenes (manufactured by TOSOH Corp., a calibration curve was drawn employing 13 kinds of polystyrenes having a molecular weight of from 1,000,000 to 500. Herein, 13 kinds of polystyrenes having a molecular weight divided equally among 13 are preferably used.

When the cellulose ester film is used as a retardation film, the cellulose ester used is preferably cellulose acetate propionate, and in the cellulose acetate propionate, acetate propionate, one is preferred which satisfies the following relationship:

$$2.55 \leq X+Y \leq 2.85$$

$$1.5 \leq X \leq 2.4$$

wherein X represents an acetyl substitution degree, and Y represents a propionyl substitution degree.

In the invention, cellulose esters, which are synthesized from cotton lint, a tree pulp or other raw materials, can be used singly or in combination.

The cellulose ester film is influenced by a minute amount of a metal component contained in the cellulose ester film. The metal component is considered to be derived from water used during manufacture. The content of a component capable of forming an insoluble nucleus is preferably less. A metal ion such as an iron, calcium, or magnesium may form a salt with a polymer decomposition compound which may contain an organic acid group to form an insoluble product, and the less content of the metal ion is preferred. An iron (Fe) component content is preferably not more than 1 ppm. A calcium component is contained in water of and water containing a large amount of the calcium component is hard water which is unsuitable for a drinking water. The calcium component is likely to form a complex with an acid such as a carboxylic acid or a sulfonic acid or with various ligands to produce a scum (insoluble sediment or muddiness) derived from various insoluble calcium compounds.

The calcium component content of cellulose ester is preferably not more than 60 ppm, and more preferably from 0 to 30 ppm. An excessive content of a magnesium component produces insoluble products, and the magnesium component content of cellulose ester is preferably from 0 to 70 ppm, and more preferably from 0 to 20 ppm. The content of the metal component such as an iron (Fe), calcium (Ca) or magnesium (Mg) component in the cellulose ester is determined by analyzing a dried cellulose ester employing a micro digest wet decomposition device (sulfuric nitric acid decomposition) or by analyzing a cellulose ester after alkali-fusion pre-processing employing ICP-AES (induced combination plasma emission spectrophotometer).

A return scrap of cellulose ester film may be used instead of cellulose ester. The return scrap content of a cellulose ester dope such as a main dope is preferably from 0 to 70% by weight, more preferably from 10 to 50% by weight, and still more preferably from 20 to 40% by weight, based on the solid content of the dope. The above return scrap content range is preferred, since the higher return scrap content provides good filterability, and the lower return scrap content provides good sliding property.

When the return scrap is used, the amount of additives such as a plasticizer, a UV absorbent or microparticles contained in a cellulose ester film is reduced corresponding to the added amount of the return scrap, so that the final cellulose ester film composition is a designed one.

The solvent used for preparing the main dope may be any solvent as long as it can dissolve cellulose esters. Even a solvent, which does not dissolve cellulose esters, can be used if its mixture with another solvent dissolves cellulose esters. A mixed solvent, containing a poor solvent in an amount of 4 to 30% by weight and methylene chloride as a good solvent, is preferably used.

Examples of good solvents of the cellulose ester include methylene chloride, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. Of these, a halogenated organic compound such as methylene chloride, dioxolane derivatives, methyl acetate, and ethyl acetate are preferred. Methylene chloride is especially preferred in minimizing curl of the cellulose ester film.

Examples of poor solvents include an alcohol having a carbon atom number of 1 to 8, for example, methanol, ethanol, n-propanol, iso-propanol, n-butanol, sec-butanol, or tert-butanol; methyl ethyl ketone; methyl isobutyl ketone; ethyl acetate; propyl acetate; monochlorobenzene; benzene; cyclohexane; tetrahydrofuran; methylcellosolve; and ethylene glycol monomethyl ether. These poor solvents can be used singly or in combination.

After the dissolution, the cellulose ester solution (dope) is filtered employing filter materials, is then defoamed, and is subsequently pumped to the next process. In the dissolution, the microparticles described above, a plasticizer, an antioxidant, or a UV absorbent are preferably added to the dope.

Employing the dope obtained above, a cellulose ester film can be prepared through a dope cast process explained below.

(Casting Process)

The casting process is one in which a dope is conveyed to a pressure die through a pressure type metering gear pump, and cast from said pressure die on a support (hereinafter referred to also as a support) for casting such as a moving endless metal belt or a rotating metal drum at a casting position. The surface of the support for casting is specular.

As other casting processes, there is a doctor blade method adjusting the dope thickness of the cast dope with a doctor blade or a reverse roller method adjusting the dope thickness of the cast dope with a reverse roller coater rotating reversely. A pressure die is preferred in which the slit shape at the mouth piece portion can be regulated and the film thickness is readily regulated to be uniform. Examples of the pressure die include a coat hanger die, a "T" die, and the like, and any of these is preferably employed.

In order to increase the casting speed, two or more pressure dies may be provided on the metal support and dopes divided into two or more may be simultaneously cast on the metal support. A laminated cellulose ester film can be prepared by simultaneously casting (co-casting) plural cellulose ester dopes different in composition from a die with plural slits on a support.

A cellulose ester film is prepared by casting the cellulose ester dope obtained above on a support such as a belt or a drum. In the invention, a solution cast film manufacture process employing a belt is especially preferred. This is because drying conditions on the support can be easily controlled in detail.

(Solvent Evaporation Process)

The solvent evaporation process is one in which a web (in the invention, a film is called a web which is formed after a dope is cast on a support for casting) is heated on a support for casting and solvents are evaporated. In order to evaporate solvents, methods include a method in which air is blown from the web side, and/or a method in which heating is carried out from the reverse surface of the support employing liquid, and a method in which heating is carried out from the surface as well as the revere surface employing heat radiation. Of these, the reverse surface liquid heating method is preferred due to high drying efficiency. Further, these methods are preferably combined. The cast web on the support is dried preferably on the support at 40 to 100° C. Heating the web to a temperature of 40 to 100° C. is preferably carried out employing air having that temperature or an infrared ray heater.

In the invention, the web is preferably peeled within the time range of from 30 to 90 seconds after the casting on the support in view of peeling property, film surface quality, moisture vapor permeability and film curl.

(Peeling Process)

The peeling process is one in which a web, which has been subjected to evaporation of solvents on the support, is peeled at the peeling position. The peeled web is conveyed to the subsequent process. When the residual solvent amount (represented by the formula described below) is too large, it may be difficult to peel the web. On the contrary, when peeling is carried out after fully drying the web on the support, a part of the web may peel prior to the peeling position.

It is preferred in the invention that temperature at the peeling position on the support is 10 to 40° C., and preferably 11 to 30° C. The residual solvent amount at the peeling position is preferably 25 to 120% by weight, and more preferably 40 to 100% by weight.

The residual solvent amount in the invention is expressed employing the following formula:

Residual solvent amount (weight %)={(weight of a web before heat treatment−weight of a web after heat treatment)/weight of a web before heat treatment}×100 wherein the heat treatment represents heating the web at 115° C. for one hour.

In order to adjust the residual solvent to the amount described above at the peeling position, the temperature of the support at the peeling position is preferably set at the range described above so that evaporation of the organic solvent from the web was effectively carried out by controlling the temperature of the surface of the support for casting. In order to control the temperature of the support, a heat transfer method having a good efficiency of heat transfer, for example, heat transfer from the rear surface of the support, is preferred.

A heat transfer employing radiant heat or a hot air is difficult to control the temperature of the support, and is not so preferable. When the support is a rotating belt, and is at the lower position, the temperature of the belt can be controlled by mildly blowing the hot air onto the support.

The support temperature can be varied at the different positions of the support through different heating methods, and can be varied at the casting position on the support, at the drying position on the support, or at the peeling position on the support.

Listed as a method to increase the film forming speed is a gel casting method (in which peeling can be carried out even though the amount of residual solvents is relatively great).

The gel casting methods include a method in which poor solvents with respect to the cellulose ester are added to a dope and gelling is carried out after casting said dope, and also a method in which gelling is carried out by decreasing the temperature of a support, and the like. There is further a method in which metal salts are added to the cellulose ester dope.

By strengthening the web through gelling the dope on the support, it is possible to carry out earlier peeling and to increase the casting speed.

When the cellulose ester film of the invention is used as a polarizing plate protective film, it is preferred that during manufacture, the film web is stretched in the MD direction when the residual solvent content of the web is not less than 40% by weight, and in the TD direction when the residual solvent content of the web is less than 40% by weight. The reason is because the web, which has been stretched when the residual solvent content is high, provides disordered orientation in the TD direction and reduces an elasticity modulus improving effect, although orientation in the MD direction is improved.

The cellulose ester film of the invention has orientation without disorder and improved elasticity modulus.

Stretching of the web in the MD direction is started preferably when the residual solvent content of the web is 60 to 120% by weight, and more preferably when the residual solvent content of the web is 90 to 110% by weight. Stretching of the web in the TD direction is started preferably when the residual solvent content of the web is 1 to 30% by weight, and more preferably when the residual solvent content of the web is 5 to 20% by weight, When the cellulose ester film of the invention is used as a polarizing plate protective film, the stretching magnification of the cellulose ester film is preferably from 1.05 to 1.3, and more preferably from 1.05 to 1.15 in both MD and TD directions. The cellulose ester film area is increased by a factor of preferably 1.12 to 1.44, and more preferably 1.15 to 1.32 by stretching in the MD and TD direction. The area increment is obtained by (stretching magnification in the MD direction x stretching magnification in the TD direction). The stretching magnification range described above is preferred in elasticity modulus, retardation $R_0$, and haze.

When the cellulose ester film containing the microparticles in the invention is stretched, haze increase is minimized, although the microparticles have a relatively large average primary particle diameter.

In order to stretch the film web in the MD direction, the film web is peeled from a casting support at a peeling tension of preferably not less than 130 N/m, and more preferably from 150 to 170 N/m. The film web after peeled has a high residual solvent content can be stretched in the MD direction maintaining the same tension as the peeling tension. As the web is dried and the residual solvent content is small, the stretching magnification in the MD direction lowers.

A roll span in a stretching zone where stretching is carried out in the MD direction is preferably not more than 1 m. When the cellulose ester film having a molecular weight distribution in the invention is stretched in the MD direction at a high residual solvent content, wrinkles are likely to occur in the MD direction, however, the roll span not more than 1 m can prevent the wrinkles. When the web is stretched in the MD direction, temperature of the web is preferably from 10 to 40° C., providing good flatness of the film.

The stretching magnification in the MD direction is calculated from a rotational speed of a belt support and a driving speed of a tenter.

In order to stretch the web in the TD direction, a method disclosed in Japanese Patent O.P.I. Publication No. 62-46625 is preferably used which comprises drying the web while holding the both edges in the transverse direction of the web by clips or pins to maintain the web width (called "a tenter method"). A tenter method employing clips or a pin-tenter method employing pins is preferably used.

When the web is dried in a tenter, the drying temperature is preferably from 30 to 150° C., more preferably from 80 to 150° C., and still more preferably from 100 to 140° C. A lower drying temperature reduces evaporation of additives such as UV absorbents or plasticizers, or contamination of the film during manufacture, and a lower drying temperature provides good flatness and elasticity modulus. Generally when cellulose ester film is stretched, foreign matter is likely to occur on the film surface. The present invention provides advantageous effects when the cellulose ester film is manufactured in a cellulose ester film manufacturing process comprising a stretching step.

In the invention, a retardation in plane $R_0$ of a cellulose ester film can be computed from refractive indices at a wavelength 590 nm in the three axis directions, Nx, Ny, and Nz of the film obtained by being measured by means of an automatic birefringence meter KOBRA-21ADH (produced by Oji Keisokukiki Co., Ltd.).

The retardation in plane $R_0$ is preferably from 20 to 200 nm, and a retardation in the thickness direction Rt of the film is preferably 70 to 400 nm. The retardation in plane $R_0$ is more preferably from 30 to 700 nm.

$$R_0 = (Nx - Ny) \times d$$

$$Rt = \{(Nx + Ny)/2 - Nz\} \times d$$

Wherein Nx, Ny and Nz represent a refractive index in the directions of the major axes, x, y, and z of an index ellipsoid, Nx, and Ny represent a refractive index in plane of film, Nz represent a refractive index in the thickness direction of film, $Nx \geq Ny$, and d represents a thickness (nm) of film.

The cellulose ester film of the invention satisfies preferably the following formula between a retardation in plane $R_0$ and an angle θ (radian) of the delayed phase axis direction with respect to the mechanical direction, and such a cellulose ester film is preferably used as an optical film such as a protective film of a polarizing plate.

$$P \leq 1 - \sin^2(2\theta)\sin^2(\pi R_0/\lambda)$$

$$P = 0.9999$$

wherein θ represents the angle (radian) of the delayed phase axis direction in the plane of the film with respect to the mechanical direction of the film, λ represents the wavelength 590 nm of light used for measuring the above Nx, Ny, Nz, and θ, and π represents the circle ratio.

(Drying Process)

The drying process is a process, which dries the web employing a drying apparatus in which said web is alternatively transported through staggered rollers and/or a tenter apparatus in which said web is transported while holding both edges of the web employing clips. In the drying process, a transport tension for transporting the web is preferably the possible lowest, since $R_0$ can be maintained lower. The transport tension is preferably not more than 190 N/m, more preferably not more than 170 N/m, still more preferably not more than 140 N/m, and most preferably from 100 to 130 N/m. It is especially effective that the transport tension is maintained within the above range till the residual solvent amount is not more than 5% by weight.

A common drying method is one in which both surfaces of the web are heated by heated air flow. Instead of the air flow, employed is a method in which heating is carried out employing microwaves. Too rapid drying tends to degrade the flatness of the finished film. A high temperature drying is preferably applied to the web having a residual solvent content of not more than 8% by weight. During the entire drying process, drying temperature is commonly from 40 to 250° C., and preferably 40 to 160° C.

In the drying process after peeling the web from the support, the web tends to shrink in the transverse direction due to evaporation of the organic solvent. When the web is dried rapidly at a higher temperature, the tendency of the web shrinkage is stronger.

Drying of the web while the shrinkage is minimized as far as possible is preferable in improving a flatness of the finished cellulose ester film. In view of the above, a method disclosed in Japanese Patent O.P.I. Publication No. 62-46625 is preferably used which comprises drying the web while holding the both edges in the transverse direction of the web by clips or pins to maintain the web width (called "a tenter method"). A tenter method employing clips or a pin-tenter method employing pins is preferably used.

The stretching magnification in the TD direction is preferably from 0 to 100%. When the cellulose ester film is used as a polarizing plate protective film, the stretching magnification of the film in the TD direction is preferably from 5 to 20%, and more preferably from 8 to 15%. When the cellulose ester film is used as a retardation film, the stretching magnification of the film in the TD direction is preferably from 10 to 40%, and more preferably from 20 to 30%. Retardation $R_0$ can be controlled by the stretching magnification. A high stretching magnification provides good flatness of the film. The present invention exhibits advantageous effects in the cellulose ester film manufactured at a high stretching magnification in which microparticle aggregates are likely to occur as foreign matter on the film surface.

When the web is dried in a tenter, the web has a residual solvent content of preferably from 20 to 100% by weight, and is dried in the tenter to a residual solvent content of preferably not more than 10%, and more preferably not more than 5%.

When the web is dried in a tenter, the drying temperature is preferably from 30 to 150° C., more preferably from 50 to 120° C., and still more preferably from 70 to 100° C. A lower drying temperature reduces evaporation of additives such as UV absorbents or plasticizers, or contamination of the film during manufacture, and a lower drying temperature provides good flatness. The UV absorbent represented by formula (I) is difficult to evaporate at high drying temperature, and exhibits advantageous effects in cellulose ester film manufactured under conditions of high drying temperature and high stretching magnification.

The cellulose ester film peeled from the support is further dried in the drying process to give a residual solvent content in the film of preferably not more than 0.5 weight %, more preferably not more than 0.1 weight %, and most preferably from 0 to 0.01 weight %.

In the drying process of the film, the film is generally transporting on rollers or in the above pintenter while drying. The film for a liquid crystal display is preferably dried maintaining the film width in the pintenter, which increases dimensional stability of the film. It is especially preferable in view of increased film dimensional stability that the film is dried while holding the film width of a film immediately after the film is peeled from the support, which still has a relatively high residual solvent content. The means for drying the film is not specifically limited, and heated air, infrared light, heated rollers or micro waves are generally employed. The heated air is preferably used in view of its convenience. It is preferable that the drying temperature is gradually-elevated in separate 3 to 5 stages in the range of from 40 to 150° C. It is more preferable in view of film dimensional stability that the drying temperature is gradually elevated in separate 3 to 5 stages in the range of from 80 to 140° C.

In the process from the casting to the drying in the solution cast film manufacture process, drying of the web in the drying apparatus may be carried out at an air atmosphere or at an atmosphere of an inert gas such as a nitrogen gas, a carbon dioxide gas or an argon gas.

It is not needless to say that the explosion limits of the vaporized organic solvents in the drying apparatus should be always considered.

(Winding Process)

This process is one in which after the residual solvent content of the web is not more than 2% by weight, the resulting cellulose ester film is wound around a spool. The cellulose ester film having a residual solvent content of not more than 0.4% by weight provides good dimensional stability.

Any of conventional winding methods can be used, and examples of the winding methods include a constant torque method, a constant tension method, a taper tension method, and a method programmed so as to have a constant inside stress.

The thickness of the cellulose ester film can be adjusted by controlling a dope concentration, a dope amount supplied by a pump, a slit width of the mouth piece portion of a die, an extrusion pressure of a die, or a moving speed of a support for casting.

It is preferred that the thickness of the cellulose ester film is uniformly regulated by feeding back a thickness information detected by a thickness detector to the devices described above through a system programmed in advance for information to be fed back to them.

The optimum thickness of the cellulose ester film is different depending upon purpose of use. The thickness of the cellulose ester film is ordinarily from 5 to 500 μm, and preferably from 10 to 200 μm. The thickness of a cellulose ester film used in a liquid crystal display is from 10 to 120 μm. The cellulose ester film of the invention exhibits advantageous effects, particularly when it has a thickness of 10 to 60 μm.

The cellulose ester film of the invention contains the cellulose ester in an amount of preferably from 60 to 95% by weight, more preferably from 70 to 90% by weight, and still more preferably from 80 to 90% by weight.

In the invention, moisture vapor transmittance of the film was measured at 25° C. and 90% RH according to a method described in JIS Z 0208. The moisture vapor transmittance of the film is preferably from 20 to 250 $g/m^2 \cdot 24$ hours, and more preferably 20 to 200 $g/m^2 \cdot 24$ hours. The above range of the moisture vapor transmittance is preferred in view of durability of a polarizing plate employing the film or drying of an adhesive used in the manufacture of a polarizing plate employing the film. The moisture vapor transmittance of the film is most preferably from 25 to 200 $g/m^2 \cdot 24$ hours.

Dimensional stability of the cellulose ester film of the invention can be improved by reducing the weight change of the film after storage at 80° C. and at 90% RH.

The cellulose ester film of the invention has rate of weight change within the range of preferably ±2%, the rate representing, in terms of percentage, the ratio of the difference between the film weights before and after storage at 80° C. and 90% RH for 48 hours to the film weight before the storage. Such a cellulose ester film, even when it has a reduced thickness, provides an excellent dimensional stability as well as improved moisture vapor permeability.

After the cellulose ester film of the invention is stored at 80° C. and at 90% RH for 48 hours, rate of dimensional change in the mechanical direction (MD) of the film and rate of dimensional change in the transverse direction (TD) of the film both are preferably within the range of ±0.5%, more preferably within the range of ±0.3%, still more preferably within the range of ±0.1%, and most preferably within the range of ±0.05%.

The rate of dimensional change referred to in the invention is a characteristic value showing dimensional change in the mechanical and transverse directions of the film after stored under severe conditions such as high temperature and high humidity. Typically, after the film is stored at high temperature, at high humidity or at high temperature and high humidity, dimensional change in the mechanical and transverse directions of the film is measured.

A film sample for test was cut into a size of 150 mm (in the transverse direction)×120 mm (in the mechanical direction), and two points 100 mm distant from each other were marked with the cross "+" on the film surface in each of the mechanical direction (MD) and the transverse direction (TD), employing a knife. The resulting sample was subjected to humidity conditioning at 23° C. and at 55% RH for 24 hours, and the distances L1 in the mechanical and transverse directions between the two points before high temperature and high humidity treatment was measured through a factory microscope. Thereafter, the sample was subjected to high temperature and high humidity (at 80° C. and at 90% RH for 48 hours), and then again subjected to humidity conditioning at 23° C. and at 55% RH for 24 hours. The distances L2 in the mechanical and transverse directions between the two points after the treatment were measured through a factory microscope. The rate of dimensional change is represented by the following formula:

Rate(%) of dimensional change=$\{(L2-L1)/L1\} \times 100$ wherein L1 represents the distance before the treatment between the two points, and L2 represents the distance after the treatment between the two points.

Intended dimensional change of the film can be measured by marking two points on the film surface in each of the transverse and mechanical directions After the cellulose ester film is stored at 105° C. for 5 hours, the rate of dimensional change in the MD direction and the rate of dimensional change in the TD direction both fall within the range of preferably ±0.5%, more preferably ±0.3%, still more preferably ±0.1%, and most preferably ±0.05%.

In the cellulose ester film of the invention, tensile stress in the MD direction of the film and tensile stress in the TD direction of the film both are preferably from 90 to 170 N/mm$^2$, and more preferably from 120 to 160 N/mm$^2$.

The moisture content of the cellulose ester film is preferably from 0.1 to 5%, more preferably from 0.3 to 4%, and most preferably from 0.5 to 2%.

The cellulose ester film of the invention has a transmittance of preferably not less than 90%, more preferably not less than 92%, and most preferably not less than 93%. The cellulose ester film of the invention has a haze of preferably not more than 0.5, more preferably not more than 0.1%, and most preferably 0%.

The absolute curl value of the cellulose ester film of the invention is preferably lower. The film curl can be in the + direction or in the − direction. The absolute curl value of the cellulose ester film is preferably not more than 30, more preferably not more than 20, and most preferably not more than 10. The curl value is represented in terms of radius of curvature (1/m).

The process of manufacturing the cellulose ester film of the invention according to a solution cast film manufacture method will be explained below employing figures.

FIG. 1 is a schematic view showing one of preferred embodiments of a solution cast film manufacture process. FIG. 1(a) is a schematic view showing a process which comprises a dope casting step, and a roller transporting and drying step in that order. FIG. 1(b) is a schematic view showing a process which comprises a dope casting step, a roller transporting and drying step, and a tenter transporting and drying step in that order. FIG. 1(c) is a schematic view showing a process which comprises a dope casting step, a tenter transporting and drying step, and a roller transporting and drying step in that order. FIG. 1(d) is a schematic view showing a process which comprises a dope casting step, a first roller transporting and drying step, a tenter transporting and drying step, and a second roller transporting and drying step in that order.

In the invention, the process comprising a tenter transporting and drying step or a roller transporting and drying step is a process which resides between a web peeling step and a web winding step, during which elongation or shrinkage of the web is regulated. The tenter transporting and drying step refers to a step of drying a cellulose ester web while transporting the web in a tenter, during which elongation or shrinkage of the web is regulated. The roller transporting and drying step refers to a step of drying a cellulose ester web while transporting the web through rollers, during which elongation or shrinkage of the web is regulated.

In FIGS. 1(a) through 1(d), numerical number 1 shows an endless moving belt support. As the support is used a mirror surface metal band. Numerical number 2 shows a die for casting on the support 1 a dope in which cellulose ester is dissolved in a solvent. Numerical number 3 shows a peel position at which, after the cast dope is solidified on the support 1 to form a web, the web is peeled from the support 1. Numerical number 4 shows a peeled web. Numerical number 5 shows a tenter transporting and drying step. Numerical number 51 shows an air discharging port, and numerical number 52 shows a drying air introducing port. Air discharging port 51 and the drying air introducing port 52 may be reversed. Numerical number 6 shows a tension changing means. Examples of the tension changing means include nip rollers and suction rollers. The tension changing means may be located between any two adjacent steps.

Numerical number 8 shows a roller transporting and drying step. Numerical number 81 shows a drying chamber, numerical number 82 shows an air discharging port, and numerical number 83 shows a drying air introducing port. The air discharging port 82 and the drying air introducing port 83 may be reversed. Numerical number 84 shows upper transporting rollers, and numerical number 85 shows lower transporting rollers. One upper transporting roller and one lower transporting roller which immediately follows constitute one pair of transporting rollers, and transporting rollers 84 and 85 are composed of plural pairs of transporting rollers. Numerical number 7 shows a cellulose ester film winding step at which the cellulose ester film is wound around a spool to form a roll.

In a process illustrated in FIG. 1(d), the roller transporting and drying step, which resides upstream of the tenter transporting and drying step 5, is called a first roller transporting and drying step, and the roller transporting and drying step, which resides downstream of the tenter transporting and drying step 5, is called a second roller transporting and drying step. A cooling step, which is not illustrated in any of FIG. 1(a) through FIG. 1(d), may be optionally provided prior to the cellulose ester film winding step.

In the invention, a cellulose ester film can be manufactured according to any solution cast film manufacture method as described above.

The cellulose ester film of the invention is preferably used in a member of a liquid crystal display such as a polarizing plate protective film in view of good moisture vapor permeation and dimensional stability thereof. The cellulose ester film of the invention is especially preferably used in a polarizing plate protective film in which severe moisture vapor permeation and dimensional stability both are required.

The polarizing plate in the invention can be prepared according to conventional methods. There is, for example, a method in which an optical film or a cellulose ester film is subjected to an alkali saponification, and the resulting film is adhered through an aqueous completely saponified polyvinyl alcohol solution to both surfaces of a polarizing film which is prepared by immersing a polyvinyl alcohol film in an iodine solution, and stretching the resulting film. The alkali saponification refers to treatment in which the cellulose ester film is immersed in a strong alkali solution at high temperature in order to enhance wettability of the film to an aqueous adhesive and provide good adhesion to the film.

Various functional layers such as a hard-coat layer, an anti-glare layer, an anti-reflection layer, an anti-stain layer, an anti-static layer, a conductive layer, an optically anisotropic layer, a liquid crystal layer, an orientation layer, a sticky layer, an adhesion layer, and a subbing a sticky layer can be provided on the cellulose ester film of the invention. These functional layers can be provided on the film by coating, evaporation, spattering, plasma CVD or plasma treatment under atmospheric pressure. It is preferred that a hard-coat layer, an anti-glare layer (an anti-glare hard-coat layer), or an anti-reflection layer be provided on the cellulose ester film.

(Hard Coat Layer)

In the invention, it is preferred that a hard coat layer is provided on the cellulose ester film described above to obtain a hard coat film. An actinic ray curable resin layer used as the hard coat layer will be explained below.

In the hard coat film of the invention, an actinic ray curable resin layer is preferably used as the hard coat layer.

The actinic ray curable resin layer refers to a layer which contains, as a main component, a resin cured through a crosslinking reaction when exposed to actinic rays such as ultraviolet light or electron beams. The actinic ray curable resin layer preferably contains an ethylenically unsaturated monomer, which is exposed to actinic rays such as ultraviolet light or electron beams and cured to form a hard coat layer. Listed as representative actinic ray curable resins are ultraviolet curable resins as well as electron beam curable resins. The actinic ray curable resin is preferably an ultraviolet curable resin.

Listed as ultraviolet curable resins may be, for example, ultraviolet curable urethane acrylic resins, ultraviolet curable polyester acrylate resin, ultraviolet curable epoxy acrylate resins, ultraviolet curable polyol acrylate resins, or ultraviolet curable epoxy resins.

The ultraviolet curable urethane acrylate resins are easily prepared in such a manner that acrylate based-monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, those described in Japanese Patent O.P.I. Publication No. 59-151110 can be used.

For example, preferably employed is a mixture comprising 100 parts of Unidick 17-806 (manufactured by Dainippon Ink and Chemicals Inc.) and one part of Coronate L (manufactured by Nippon Urethane Industry Co., Ltd.).

The ultraviolet ray curable polyesteracrylate resins include those prepared easily by reacting a polyesterpolyol with 2-hydroxyethylacrylate or 2-hydroxypropylacrylate, disclosed for example, in Japanese Patent O.P.I. Publication No. 59-151112.

Examples of the ultraviolet ray curable epoxyacrylate resin include those prepared by reacting an epoxyacrylate oligomer in the presence of a reactive diluting agent and a photoinitiator, disclosed for example, in Japanese Patent O.P.I. Publication No. 1-105738.

Examples of the ultraviolet ray curable polyolacrylate resin include trimethylolpropane triacrylate, ditrimethylolpropane tetraacrylate, pentaerythritol triacrylate, pentaerythritol tetraacrylate, dipentaerythritol hexaacrylate or alkyl-modified dipentaerythritol pentaacrylate.

The photoinitiators for the ultraviolet ray curable resins include benzoine or its derivative, or acetophenones, benzophenones, hydroxy benzophenones, Michler's ketone, α-amyloxime esters, thioxanthones or their derivatives an oxime ketone derivative, a benzophenone derivative or a thioxanthone derivative. These photoinitiators may be used together with a photo-sensitizer. The above photoinitiators also work as a photo-sensitizer. Sensitizers such as n-butylamine, triethylamine and tri-n-butylphosphine can be used in photo-reaction of epoxyacrylates. The content of the photoinitiators or sensitizers in the ultraviolet ray curable resin layer is 0.1 to 15 parts by weight, and preferably 1 to 10 parts by weight, based on the 100 parts by weight of the ultraviolet ray curable resin layer.

The polymerizable monomers having one unsaturated double bond in the molecule include methyl acrylate, ethyl acrylate, butyl acrylate, benzyl acrylate, cyclohexyl acrylate, vinyl acetate, and styrene. The polymerizable monomers having two or more unsaturated double bonds in the molecule include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate.

The UV curable resins available on the market utilized in the present invention include Adekaoptomer KR, BY Series such as KR-400, KR-410, KR-550, KR-566, KR-567 and BY-320B (manufactured by Asahi Denka Co., Ltd.); Koeihard A-101-KK, A-101-WS, C-302, C-401-N, C-501, M-101, M-102, T-102, D-102, NS-101, FT-102Q8, MAG-1-P20, AG-106 and M-101-C (manufactured by Koei Kagaku Co., Ltd.); Seikabeam PHC2210(S), PHC X-9(K-3), PHC2213, DP-10, DP-20, DP=30, P1000, P1100, P1200, P1300, P1400, P1500, P1600, SCR900 (manufactured by Dainichiseika Kogyo Co., Ltd.); KRM7033, KRM7039, KRM7131, UVECRYL29201 and UVECRYL29202 (manufactured by Daicel U. C. B. Co., Ltd.); RC-5015, RC-5016, RC-5020, RC-5031, RC-5100, RC-5102, RC-5120, RC-5122, RC-5152, RC-5171, RC-5180 and RC-5181 (manufactured by Dainippon Ink & Chemicals, Inc.); Olex No. 340 Clear (manufactured by Chyugoku Toryo Co., Ltd.); Sunrad H-601, RC-750, RC-700, RC-600, RC-500, RC-611 and RC-612 (manufactured by Sanyo Kaseikogyo Co., Ltd.); SP-1509 and SP-1507 (manufactured by Syowa Kobunshi Co., Ltd.); RCC-15C (manufactured by Grace Japan Co., Ltd.) and Aronix M-6100, M-8030 and M-8060 (manufactured by Toagosei Co., Ltd.).

Concrete examples include trimethylol propane triacrylate, ditrimethylol propane tetracrylate, pentaerythritol triacrylate, pentaerythritol tetraacrylate, dipentaerythritol hexaacrylate and alkyl modified dipentaerythritol pentaacrylate.

These actinic ray curable resin layers can be applied by any method well known in the art, for example: a gravure coater, a dip coater, a reverse coater, a die coater and ink jet printing.

Light sources to cure layers of UV curable-resin by photocuring reaction are not specifically limited, and any light source may be used as far as UV ray is generated. For example, a low-pressure mercury lamp, a medium-pressure mercury lamp, a high-pressure mercury lamp, an ultrahigh-pressure mercury lamp, a carbon arc lamp, a metal halide lamp and a xenon lamp may be utilized. The preferable irradiation quantity of light may be changed depending on the type of lamp, however, it is preferably from 5 to 150 mJ/cm$^2$, and more preferably from 20 to 100 mJ/cm$^2$.

Irradiation of an actinic ray is preferably carried out under tension in the longitudinal direction of the film and more preferably under tension in both the lateral and the longitudinal directions. The preferable tension is from 30 to 300 N/m. The method to provide tension is not specifically limited and following methods are preferably used: (i) a method of providing tension while the film is being transported over back rolls, and (ii) a method using a tenter to give tension in the lateral direction or in biaxial directions. A cellulose ester film exhibiting a superior flatness can be obtained using these methods.

An organic solvent used for a coating solution of a UV curable-resin can be selected from, for example, the hydrocarbon series (toluene and xylene), the alcohol series (methanol, ethanol, isopropanol, butanol and cyclohexanol), the ketone series (acetone, methyl ethyl ketone and isobutyl ketone), the ester series (methyl acetate, ethyl acetate and methyl lactate), the glycol ether series and other organic solvents. These organic solvents may be also used in combination. The above mentioned organic solvents preferably contain propylene glycol monoalkyl ether (the alkyl having 1 to 4 carbon atoms) or propylene glycol monoalkyl ether acetate (the alkyl having 1 to 4 carbon atoms) in an amount of 5% by weight or more, and more preferably from 5 to 80% by weight.

In a coating solution of a UV ray-curable resin, a silicon compound such as a polyether modified silicone oil, is preferably added. The number average molecular weight of the polyether modified silicone oil is preferably from 1,000 to 100,000 and more preferably from 2,000 to 50,000.

Addition of the polyether modified silicone oil with a number average molecular weight of less than 1,000 may lower the drying rate of the coating solution, while that of more than 100,000 may be difficult to bleed out at the surface of the coated film.

Silicon compounds available on the market include, for example: DKQ8-779 (a trade name of Dow Corning Corp.), SF3771, SF8410, SF8411, SF8419, SF8421, SF8428, SH200, SH510, SH1107, SH3771, BX16-034, SH3746, SH3749, SH8400, SH3771M, SH3772M, SH3773M, SH3775M, BY-16-837, BY-16-839, BY-16-869, BY-16-870, BY-16-004, BY-16-891, BY-16-872, BY-16-874, BY22-008M, BY22-012M, FS-1265 (all being trade names of Dow Corning Toray Silicone Co., Ltd.), KF-101, KF-100T, KF351, KF352, KF353, KF354, KF355, KF615, KF618, KF954, KF6004, silicone X-22-945, X22-160AS (all being trade names of Shin-Etsu Chemical Co., Ltd.), XF3940, XF3949 (both being trade names of Toshiba Silicones Co., Ltd.), DISPARLONLS-009 (a trade name of Kusumoto Chemicals Ltd.), GLANOL410 (a trade name of Kyoeisha Chemicals Co., Ltd.), TSF4440, TSF4441, TSF4445, TSF4446, TSF4452, TSF4460 (all being trade names of GE Toshiba Silicones Co., Ltd.), BYK-306, BYK-330, BYK-307, BYK-341, BYK-361 (all being trade names of BYK-Chemie Japan KK), L Series (L-7001, L-7006, L-7604 and L-9000), Y Series and FZ Series (FZ-2203, FZ-2206 and FZ-2207) (all from Nippon Unicar Co., Ltd.).

These compositions may improve the coating ability of a coating solution onto a substrate or an under coat layer. These compounds used in the top layer of film may contribute to improvement of scratch resistance of the film as well as water-resistance, oil-resistance and anti-stain properties of the film. The content of the silicon compound is preferably from 0.01 to 3% by weight based on the solid components in the coating solution.

The aforementioned coating methods are also used as coating method of a UV ray-curable resin layer coating solution. The wet thickness of the coated UV-curable resin layer is preferably from 0.1 to 30 μm and more preferably from 0.5 to 15 μm. The dry thickness of the coated UV-curable resin layer is preferably from 0.1 to 20 μm and more preferably from 1 to 10 μm.

When a thickness of a cellulose ester film is from 10 to 80 μm and a (d/H) ratio is from 4 to 10, it may exhibit a superior flatness as well as a sufficient hardness and scratch resistance, wherein H represents a thickness of a UV curable resin layer (hard coat layer) and d represents a thickness of cellulose ester film. This is because, a thinner hard coat layer compared to that of a cellulose ester film (giving a larger (d/H) value) may result in giving insufficient hardness and scratch resistance, while a thicker hard coat layer compared to the same (giving a smaller (d/H) value) may result in forming a film lacking in flatness.

The UV ray-curable resin layer is preferably irradiated with UV rays during or after drying. The duration of UV ray irradiation is preferably from 0.1 seconds to 5 minutes in order to secure the exposure amount from 5 to 100 mJ/cm$^2$ as mentioned above. In view of working efficiency and hardening efficiency of the UV-curable resin layer, the duration is more preferably from 0.1 to 10 seconds.

Intensity of the actinic ray is preferably from 50 to 150 mW/cm$^2$ on the irradiated surface.

The UV-cured resin layer thus obtained may preferably contain inorganic or organic microparticles in order to attain the following characteristics: (i) preventing blocking, (ii) improving scratch resistance, (iii) providing an antiglare property and (iv) optimizing the reflective index.

Inorganic microparticles to be contained in a hard coat layer include, for example: silicon oxide, titanium oxide, aluminum oxide, zirconium oxide, magnesium oxide, calcium carbonate, talc, clay, calcined kaolin, calcined calcium silicate, hydrated calcium silicate, aluminum silicate, magnesium silicate and calcium phosphate. Among these, silicon oxide, titanium oxide, aluminum oxide, zirconium oxide, magnesium oxide are specifically preferable.

Organic microparticles include, for example: microparticles of polymethacrylic acid methyl acrylate resin, acryl styrene based resin, polymethyl methacrylate resin, silicon based resin, polystyrene based resin, polycarbonate resin, benzoguanamine based resin, melamine based resin, polyolefin based resin, polyester based resin, polyamide based resin, polyimide based resin and polyfluorinated ethylene based resin. Specifically preferable organic microparticles include, for example: microparticles of cross-linked polystylene (such as SX-130H, SX-200H and SX-350H manufactured by Soken-Chemical & Engineering Co., Ltd.) and polymethyl methacrylate (such as MX150 and MX300 manufactured by Soken Chemical & Engineering Co., Ltd.).

The average particle diameter of the microparticles is preferably from 0.005 to 5 μm and specifically preferably from 0.01 to 1 μm. The microparticle content of the hard coat layer is preferably from 0.1 to 30 weight parts per 100 weight parts of the UV-curable resin composition.

It is preferred that the UV curable resin layer is a clear hard coat layer having a center-line average roughness (Ra prescribed by JIS B 0601) of 1 to 50 nm or an anti-glare layer Having an Ra value of from 0.1 to 1 µm. The center-line average roughness (Ra) is preferably measured by means of a surface roughness meter using interference of light, for example, RST/PLUS manufactured by WYKO Co., Ltd.

(Back Coat Layer)

The hard coat film of the present invention having a hard coat layer on one surface of the cellulose ester film is preferably provided with a back coat layer on the other surface of the cellulose ester film. A back coat layer is provided on a cellulose ester film to prevent curling which may occur when a hard coat layer or other layers are formed on a cellulose ester film by means of a coating method or by CVD. Namely, by adding a counter force to curl toward the back coat side, the force to curl toward the hard coat layer side may be balanced out. Also, a back coat layer preferably has a feature to prevent blocking. For this purpose, microparticles are preferably added to a coating composition of back coat layer.

Microparticles preferably added to the back coat layer include inorganic microparticles, for example, silicon dioxide, titanium dioxide, aluminum oxide, zirconium oxide, calcium carbonate, talc, clay, calcined kaolin, calcined calcium silicate, tin oxide, indium oxide, zinc oxide, ITO, hydrated calcium silicate, aluminum silicate, magnesium silicate and calcium phosphate. Microparticles containing silicon are preferably used to minimize the haze. Of the above, silicon dioxide is specifically preferable.

Inorganic microparticle available on the market include, for example: AEROSIL R972, R927V, R974, R812, 200, 200V, 300, R202 and OX50 which are manufacture by Nippon Aerosil Co. Ltd. Microparticles of zirconium oxide available on the market include, for example: AEROSIL R976 and R811 manufacture by Nippon Aerosil Co. Ltd. Microparticles of polymer include, for example: silicone resin, fluorine-contained resin and acryl resin. Among these, silicone resin, especially three dimensionally networked silicone resin is preferably used. Examples of silicone resins available on the market include TOSPERL 103, 105, 108, 145, 3120 and 240, which are manufactured by Toshiba Silicone Co., Ltd.

Among the microparticles listed above, AEROSIL 200V and AEROSIL R972V are particularly preferable with respect to effectively preventing blocking while minimizing haze. The kinetic friction coefficient of the rear side of the hard coat layer in the present invention is preferably not more than 0.9 and especially preferably from 0.1 to 0.9.

The content of microparticles contained in the back coat layer is preferably from 0.1 to 50% by weight and more preferably from 0.1 to 10% by weight. The increase in haze of the hard coat film with a back coat layer is preferably not more than 1 percent, more preferably not more than 0.5 percent, and still more preferably from 0.0 to 0.1 percent.

The back coat layer is formed coating, on the cellulose ester film, a coating solution containing a solvent which dissolves and/or swells cellulose ester (hereafter this solvent is referred to as "good solvent"). The solvent used may comprise a solvent which does not dissolve nor swell cellulose ester (hereinafter this solvent is referred to as "poor solvent") as well as the good solvent. The mixing ratio of these solvents and the coated amount of the coating solution to be used for forming the back coat layer is appropriately determined depending on the extent of the curl and the type of the resin used for the hard coat film.

In order to increase anti-curling of the film, the mixing ratio of a good solvent to a poor solvent is increased. The mixing ratio of the good solvent to the poor solvent is preferably 10 to 0 through 1 to 9. Examples of the good solvent include dioxane, acetone, methyl ethyl ketone, N,N-dimethyl formamide, methyl acetate, ethyl acetate, trichloroethylene, methylene chloride, ethylene chloride, tetrachloroethane, trichloroethane and chloroform. Examples of the poor solvent include methanol, ethanol, n-propyl alcohol, i-propyl alcohl, n-butanol and hydrocarbons (such as toluene, xylene and cyclohexanol).

The back coat layer is coated by means of, for example: a gravure coater, a dip coater, a reverse coater, a wire-bar coater and a die coater, in a wet thickness of preferably from 1 to 100 µm and more preferably from 5 to 30 µm. Resins utilized as a binder in a back coat layer include, for example: (i) vinyl type homopolymers or copolymers such as a vinyl chloride/vinyl acetate copolymer, a vinyl chloride resin, a vinyl acetate resin, a copolymer of vinyl acetate and vinyl alcohol, a partially hydrolyzed vinyl chloride/vinyl acetate copolymer, a vinyl chloride/vinylidene chloride copolymer, a vinyl chloride/acrylonitrile copolymer, an ethylene/vinyl alcohol copolymer, a chlorinated polyvinylchloride, an ethylene/vinyl chloride copolymer and a ethylene/vinyl acetate copolymer; (ii) cellulose ester type resins such as cellulose nitrate, cellulose acetate propionate, cellulose diacetate, cellulose triacetate, cellulose acetate phthalate and cellulose acetate butylate; (iii) rubber type resins such as a copolymer of maleic acid and/or acrylic acid, a copolymer of acrylate ester, an acrylonitrile/stylene copolymer, a chlorinated polyethylene, an acrylonitrile/chlorinated polyethylene/stylene copolymer, a methylmethacrylate/butadiene/stylene copolymer, an acryl resin, a polyvinylacetal resin, a polyvinylbutyral resin, a polyester polyuretane resin, a polyether polyurethane resin, a polycarbonate polyurethane resin, a polyester resin, a polyether resin, a polyamide resin, an amino resin, a stylene/butadiene resin and a butadiene/acrilonitrile resin; (iv) a silicone type resin; and (v) a fluorine-containing type resin, however, the present invention is not limited thereto. Examples of acryl resins available on the market include homopolymers and copolymers produced from acryl or methacryl monomers, such as: Acrypet MD, VH, MF and V (manufactured by Mitsubisi Rayon Co., Ltd.), Hi Pearl M-4003, M-4005, M-4006, M-4202, M-5000, M-5001 and M-4501 (Negami Chemical Industrial Co., Ltd.), Dianal BR-50, BR-52, BR-53, BR-60, BR-64, BR-73, BR-75, BR-77, BR-79, BR-80, BR-82, BR-83, BR-85, BR-87, BR-88, BR-90, BR-93, BR-95, BR-100, BR-101, BR-102, BR-105, BR-106, BR-107, BR-108, BR-112, BR-113, BR-115, BR-116, BR-117 and BR-118 (manufactured by Mitsubisi Rayon Co., Ltd.). A resin used in the present invention may suitably be selected from the above examples.

Cellulose type resin such as diacetyl cellulose and cellulose acetate propionate is specifically preferable.

The coating order of a back coat layer on a cellulose ester film is not specifically limited, namely, a back coat layer may be formed before or after forming the layers on the opposite surface (hard coat layer and other layers such as antistatic layer), however, when a back coat layer also functions as an antiblocking layer, the back coat layer is preferably formed before the opposite side layers. Coating of the back coat layer may preferably be divided in two or more times.

(Antireflection Layer)

It is preferred that an antireflection layer is provided on the cellulose ester film with a clear hard coat layer to obtain an antireflection film.

As the antireflection layer, plural refractive index layers are preferably provided on the hard coat layer of the hard coat film. A high refractive index layer and a low refractive index layer are preferably provided on in that order on the hard coat layer. The magnitude of the refractive index is determined by kinds of metals or compounds used in the layer. For example, Ti provides high refractive index, Si provides low refractive index, and F provides lower refractive index. The refractive index is determined by an appropriate combination thereof. The refractive index or thickness of the antireflection layer is calculated from measurement of spectral reflectance.

In the antireflection film of the invention, multiple antireflection layers are preferably laminated so that reflectance is reduced due to interference, considering refractive index, layer thickness, number of layers, or order of layers. The antireflection layer is comprised of a combination of a high refractive index layer having an index higher than that of the substrate and a low refractive index layer having an index lower than that of the substrate. Especially is preferred an antireflection layer comprising three or more refractive index layers. For example, an antireflection film is preferred in which three layers with different refractive indexes, a medium refractive index layer (having a refractive index higher than that of a substrate or a hard coat layer and lower than that of a high refractive index layer), a high refractive index layer and a low refractive index layer are provided in that order on a substrate. An antireflection layer of four or more layers is also preferably used in which two or more high refractive index layers and two or more low refractive index layers are laminated alternatively.

In order to easily remove stains or fingerprints, an anti-stain layer is preferably provided on the outermost low refractive index layer. A fluorine-containing organic silane compound is preferably used in the anti-stain layer.

In the present invention, the anti-reflection layer can be formed by a coating method. A metal oxide or metal nitride (SiO2, TiO2, Ta2O5, ZrO2, ZnO, SnO2, ITO, SiN, TiN, SiOxNy, SiOx, TiOx, TiOxNy, etc.) layer can be formed by a dry process, such as an atmospheric pressure plasma method or CVD. In the invention, the anti-reflection layer is preferably formed by a coating method.

The high refractive index layer preferably contains a titanic acid compound. This layer is a layer with a refractive index of from 1.55 to 2.5 in which is obtained by coating a solution containing microparticles, and an organic titanium compound monomer and oligomer or its hydrolyzate on a substrate and drying.

Examples of the organic titanium compound monomer or oligomer include $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, a dimer to decamer of $Ti(O-n-C_3H_7)_4$, and a dimer to decamer of $Ti(O-n-C_4H_9)_4$. These can be used singly or as a mixture of two or more thereof. Among these, $Ti(O-n-C_3H_7)$ 4, $Ti(O-i-C_3H_7)$ 4, $Ti(O-n-C_4H_9)_4$, a dimer to decamer of Ti $(O-n-C_3H_7)$ 4, and a dimer to decamer of Ti $(O-n-C_4H_9)$ 4 are preferred.

The content of the organic titanium compound monomer, the organic titanium compound oligomer or its hydrolyzates in the coating solution is preferably from 50.0 to 98.0% by weight, more preferably from 50 to 90% by weight, and still more preferably from 55 to 90% by weight, based on the solid content of the coating solution. An organic titanium compound polymer (which has been prepared by hydrolyzing a titanium compound to form a cross-linked structure) or titanium oxide particles are preferably added to the coating solution.

In the invention, the coating solution contains the above organic titanium compound monomer, organic titanium compound oligomer or partially or completely hydrolyzed product of the organic titanium compound oligomer. The organic titanium compound monomer or organic titanium compound oligomer self-condensates to form a cross-linked network structure. A catalyst or a hardening agent can be used in order to promote the condensation reaction. Examples thereof include a metal chelate compound, an organometallic compound such as a salt of an organic carboxylic acid, an organic silicate having an amino group, and an acid generating agent (a photo acid generating agent) capable of generating an acid due to light irradiation. Among these, an aluminum chelate compound or the photo acid generating agent is preferred. Examples of the aluminum chelate compound include ethylacetoacetate aluminum diisopropylate, aluminum triethylacetoacetate, alkylacetoacetate aluminum diisopropylate, aluminum monoacetylacetonate bisethylacetoacetonate, and aluminum triacetylacetonate. Examples of the photo acid generating agent include benzyltriphenylphosphonium hexafluorophosphate, another phosphonium salt and a salt of triphenylphosphonium hexafluorophosphate.

The antireflection layer coating solution preferably contains a binder of from 0.5 to 20% by weight based on the solid components in the solution.

Examples of the binder include a compound having two or more of a vinyl group, an allyl group, an acryloyl group, a methacryloyl group, an isopropenyl group, an epoxy group or an oxetanyl group and the same compound as in the actinic ray curable layer coating solution as described above, for example, an actinic ray reactive acryl or methacryl compound, an actinic ray reactive epoxy compound, or an actinic ray reactive oxetanyl compound. These compounds may be a monomer, an oligomer or a polymer. A compound having an acryloyl group, a methacryloyl group or an epoxy group is preferred in view of polymerization speed or reactivity. A polyfunctional monomer or oligomer is more preferred. The actinic ray curable resin used in the actinic ray curable resin coating solution or the hard coat layer described above is preferably used. Further, an alcohol soluble acryl resin is preferably used.

A medium or high refractive index layer containing the organic titanium compound preferably contains an alcohol soluble acryl resin as a binder, which can provide a medium or high refractive index layer with reduced thickness unevenness. Examples of the acryl resin include a homopolymer of alkyl(meth)acrylate or a copolymer of alkyl(meth)acrylate such as a copolymer of n-butyl methacrylate, iso-butyl methacrylate, methyl methacrylate, ethyl methacrylate, or propyl methacrylate, and are not limited thereto. Commercially available resins include Dianar BR-50, BR-51, BR-52, BR-60, BR-64, BR-65, BR-70, BR-73, BR-75, BR-76, BR-77, BR-79, BR-80, BR-82, BR-83, BR-85, BR-87, BR-88, BR-89, BR-90, BR-93, BR-95, BR-96, BR-100, BR-101, BR-102, BR-105, BR-107, BR-108, BR-112, BR-113, BR-115, BR-116, BR-117, and BR-118 (each produced by Mitsubishi Rayon Co., Ltd.). The refractive index can be adjusted by the added amount of the binder.

The low refractive index layer preferably contains particles of a silicon compound such as silicon oxide or particles of a fluorine-containing compound. Preferred examples of the organic silicon compound include tetramethoxysilane, tetraethoxysilane, methyltrimethoxysilane, methyltriethoxysilane, ethyltrimethoxysilane, and ethyltriethoxysilane. These compounds are hydrolyzed to obtain a silicate oligomer. The hydrolysis is carried out by a known method. For example, water is added to the above tetraalkoxysilane, and reacted in the presence of an acid catalyst at from room temperature to 100° C. while removing an alcohol produced as the reaction proceeds. The alkoxysilane is hydrolyzed due to this reaction, followed by condensation reaction, and a liquid silicate oligomer (having an average polymerization degree of 2-8, and preferably 3-6) having two or more of a hydroxyl group can be obtained as a hydrolyzate.

As the hardening catalyst, an acid, an alkali, an organometallic compounds or a metal alkoxide is used. The acid, particularly an organic acid having a sulfonyl group or a carboxyl group, for example, acetic acid, polyacrylic acid, benzene sulfonic acid, p-toluene sulfonic acid or methyl sulfonic acid is preferably used. The organic acid is more preferably one having a hydroxyl group and a carboxyl group, for example, a dihydroxy carboxylic acid such as citric acid or tartaric acid. The organic acid is still more preferably a water soluble one, and besides citric acid or tartaric acid, examples thereof include levulinic acid, formic acid, propionic acid, malic acid, succinic acid, methylsuccinic acid, fumaric acid, oxalacetic acid, pyruvic acid, 2-oxoglutaric acid, glycolic acid, D-gryceric acid, D-gluconic acid, malonic acid, maleic acid, oxalic acid, isocitric acid, and lactic acid. Further, benzoic acid, hydroxybenzoic acid or atropic acid can be optionally used.

Use of the above organic acid can provide stable hydrolyzates, which does not cause gelation at hydrolysis, and is free from a production line corrosion or safety problem resulting from use of an inorganic compound such as sulfuric acid, hydrochloric acid, nitric acid, hypochlorous acid, or boric acid. The amount of the organic solvent used is 0.1 to 10 parts by weight, and preferably 0.2 to 5 parts by weight, based on 100 parts by weight of partially hydrolyzed product. The amount of water to be added may be theoretically not less than the amount (amount equivalent to 100% by weight) necessary to completely hydrolyze the partially hydrolyzed product, and is the amount equivalent to preferably 100 to 300% by weight, and more preferably 100 to 200% by weight. Thus obtained coating solution for a low refractive index layer is extremely stable.

In the invention, cross-linking reaction due to hydrolysis and condensation of the organic silicon compound: proceeds during a ripening process, and a formed layer provides excellent layer properties. In the ripening process, an oligomer containing solution is allowed to stand for time necessary for the cross-linking to sufficiently proceed to obtain intended layer properties. Although different due to kinds of solvents used, the time, when hydrochloric acid is used, is not less than one hour, and when maleic acid is used, is not less than several hours. The time is from 8 hours to one week, and ordinarily approximately 3 days. The ripening temperature has an influence on the ripening time. The temperature may be elevated to 20° C. in an extremely cold region. Generally, ripening rapidly proceeds at higher temperature, but gelation occurs at not less than 100° C. Accordingly, the ripening temperature is suitably 50 to 60° C. Besides the above, the silicate oligomer may be a modified product modified with an organic compound (a monomer, an oligomer or a polymer) having a functional group such as an epoxy group, an amino group, an isocyanate group, or a carboxyl group. The modified product may be used singly or in combination with the above silicate oligomer.

In the invention, the low refractive index layer may contain silicon oxide particles, and preferably contains silicon oxide particles having a particle size of not more than 0.1 μm. Particularly, silicon oxide particles whose surface is modified with an alkyl group, for example, commercially available AEROSYL R972 or R972V (produced by Nihon Aerosil Co., Ltd.) being silicon oxide particles whose surface is modified with a methyl group, are preferably used. Besides these, silicon oxide particles whose surface is modified with an alkyl group, disclosed in Japanese Patent O.P.I. Publication No. 2001-2799, can be used. The silicon oxide particles can be easily prepared according to a method in which the above described silicate oligomer is hydrolyzed and then treated with an alkyl silane coupling agent. The silicon oxide particle content of the low refractive index layer is preferably from 0.1 to 40% by weight.

In order to adjust refractive index of each refractive index layer or to improve a layer quality of each refractive index layer, a silane compound can be added to each refractive index layer.

The solvents used in the medium, high or low refractive index coating solution include an alcohol such as methanol, ethanol, 1-propanol, 2-propanol, or butanol; a ketone such as acetone, methyl ethyl ketone or cyclohexanone; an aromatic hydrocarbon such as benzene, toluene or xylene; a glycol such as ethylene glycol, propylene glycol or hexylene glycol; a glycol ether such as ethyl cellosolve, butyl cellosolve, methyl carbitol, butyl carbitol, diethyl cellosolve, diethyl carbitol, propylene glycol monomethyl ether; N-methylpyrrolidone; dimethylformamide; methyl lactate; and water. These can be used singly or as an admixture of two or more thereof.

A solvent having an ether bond in the molecule is preferred, and glycol ethers are more preferred.

Examples of the glycol ethers include propylene glycol monoalkyl (C1 to C4) ethers, or propylene glycol monoalkyl (C1 to C4) ether esters. Examples of the propylene glycol monoalkyl (C1 to C4) ethers include propylene glycol monomethyl ether (PGME), propylene glycol monoethyl ether, propylene glycol mono-n-propyl ether, propylene glycol mono-iso-propyl ether, and propylene glycol monobutyl ether.

Examples of the propylene glycol monoalkyl (C1 to C4) ether esters include propylene glycol monoalkyl ether acetate such as propylene glycol monomethyl ether acetate or propylene glycol monoethyl ether acetate. These solvents are preferably added to the coating solution in an amount of from 1 to 90% by weight based on the total organic solvent used in the coating solution.

The coating solution of each refractive index layer can contain various additives. For example, the low refractive index layer preferably contains a sliding agent in improving an anti-scratching property. Examples of the sliding agent include silicone oil and waxes.

Examples thereof include higher fatty acids or their derivatives such as behenic acid, stearic acid amide, pentacosanoic acid, carnauba wax, beeswax or montan wax as a natural product, which contains these components, polyorganosiloxanes disclosed in Japanese Patent Publication No. 53-292, higher fatty acid amides disclosed in U.S. Pat. No. 4,275,146, higher fatty acid esters (esters of fatty acid having a carbon atom number of from 10 to 24 with alcohol having a carbon atom number of from 10 to 24) disclosed in Japanese Patent Publication No. 58-33541, British Patent No. 927,446, and Japanese Patent O.P.I. Publication Nos. 55-126238 and 58-90633, higher fatty acid metal salts disclosed in U.S. Pat. No. 3,933,516, polyesters of a dicarboxylic acid having a carbon atbm number up to 10 with an aliphatic or alicyclic diol disclosed in Japanese Patent O.P.I. Publication No. 51-37217, and oligopolyesters of a dicarboxylic acid with a diol disclosed in Japanese Patent O.P.I. Publication No. 7-1329.2.

The sliding agent content of the low refractive index layer is preferably from 0.01 to 10 mg/m$^2$. The sliding agent is added to the medium or high refractive index layer as necessary.

The medium, high or low refractive index layer preferably contains a surfactant, a softening agent, or a smoothing agent, whereby anti-abrasion property is improved. An anionic or nonionic surfactant, for example, sodium dialkylsulfosuccinate or ester of polyhydric alcohol and fatty acid, is preferred. Examples of the surfactant include Lipoil NT-6, NT-12, NT-33, TC-1, TC-68, TC-78, CW-6, TCF-208, TCF-608, NK oil CS-11, AW-9, AW-10, AW-20, polysoftener N-606, and a coating additive PHOSPHORESCENT COMPOUND-700 (each produced by Nicca Chemical Co., Ltd.).

The medium, high or low refractive index layer, after coated, is preferably exposed to actinic rays in order to promote hydrolysis and curing of the layer containing metal alkoxides. It is preferred that every time each layer is coated, the coated layer is exposed to actinic rays.

The actinic rays used here are the same as those used for curing the actinic ray-curable resin layer as described above. The exposure energy is different depending on the light source used, but is preferably from 20 to 10,000 $mJ/cm^2$, more preferably from 100 to 2,000 $mJ/cm^2$, and still more preferably from 400 to 2,000 $mJ/cm^2$.

When ultraviolet rays are used, multi-layered ant-reflection layers may be exposed every time one layer is coated, or multi-layered ant-reflection layers after coated may be exposed one time. The latter is preferred.

(Polarizing Plate)

The cellulose ester film, or an optical film such as a hard coat film or an antireflection film in the invention is extremely excellent as a polarizing plate protective film. A polarizing plate protective film, obtained by alkali-saponification of the cellulose ester film or optical film of the invention, is laminated on both sides of a polarizing film through an aqueous completely saponified polyvinyl alcohol solution to form a polarizing plate. The polarizing film is obtained, for example, by immersing a polyvinyl alcohol film in an iodine-containing solution and stretching. One surface of the cellulose ester film or optical film of the invention may be subjected to saponification treatment.

A polarizing film, which is a prime element that constructs a polarizing plate, is a device that transmits only light in one certain direction through a polarizing face. Typical polarizing films currently known are polyvinyl alcohol type polarizing films, which include those dyed with iodine and those dyed with a dichromatic dye. Currently used polarizing films are produced in such a way that a polyvinyl alcohol solution is formed into a film, then, the film is uniaxially stretched and then dyed, or the formed film is dyed first and then uniaxially stretched. Thereafter, the film is preferably subjected to durability processing with a boron compound. The cellulose ester film of the invention is laminated on both sides of the polarizing film to form a polarizing plate, preferably through an aqueous adhesive primarily composed of completely saponified polyvinyl alcohol etc. The cellulose ester film or optical film of the invention has a low water vapor permeation and excellent durability.

An image display employing the polarizing plate of the invention has excellent durability and provides a high contrast image for a long period.

(Display)

By incorporating the cellulose ester film, the optical film or the polarizing plate employing the same of the present invention into a display, various displays can be manufactured. Examples of the display include a liquid crystal display (of reflection type, transparent type, or semi-transparent type), an organic electrolytic emitting device, and a plasma display. The display, comprising the polarizing plate employing the cellulose ester film of the invention, is excellent in visibility and free from problems caused by the film even in accelerated aging test under high temperature and high humidity.

By incorporating the polarizing plate of the present invention into a display, a liquid crystal display with high visibility can be manufactured. The polarizing plate of the present invention are preferably used in an LCD of reflection type, transparent type, or semi-transparent-type, or in LCDs with various driving systems such as TN type, STN type, OCB type, HAN type, VA type, IPS type, etc. Particularly, a display with a large screen not smaller than a 30-inch type is free from color shading or wavy irregularities, having an effect of preventing eyestrains even for long time viewing.

EXAMPLES

The present invention will be explained below, but the invention is not limited thereto.

Example 1

<Preparation of Cellulose Ester Film Sample 1 through 15>

(Preparation of Silicon Oxide Addition Solutions "a" through "i")

Cellulose acetate propionate (total acyl substitution degree of 2.65, an acetyl substitution degree of 1.90, and a propionyl substitution degree of 0.75) of 4.0 parts by weight were added to a mixture solvent of 82.6 parts by weight of ethylene chloride and 11.8 parts by weight of ethanol in a sealed vessel while stirring, and mixed while stirring employing a dissolver for 60 minutes. After that, 1.6 parts by weight of silicon oxide microparticles A through I as shown in Table 1 described later were added with stirring to the resulting mixture, and further stirred for 60 minutes. Thus, silicon oxide addition solutions "a" through "i" as shown in Table 2 were obtained. The average particle diameter of the particles in the silicon oxide addition solutions was measured through a particle size distribution meter LS 13320 series Multi Wave produced by Beckman-Coulter Co., Ltd.

The silicon oxide microparticles A through E, H and I as shown in Table 1 were prepared according to a method described in Japanese Patent No. 3484611, and the silicon oxide microparticles F and G as shown in Table 1 were prepared without employing water droplets according to a method described in Japanese Patent No. 3484611.

(Average Primary Particle Diameter of Silicon Oxide Microparticles and Relative Standard Deviation of the Primary Particle Diameter)

The silicon oxide microparticles were added to a solvent such as water or alcohol, and dispersed in an ultrasonic disperser to obtain a dispersion. The dispersion was coated on a glass plate and dried to form a silicon oxide microparticle layer. The resulting layer was photographed (by a factor of from 500,000 to 2,000,000) through a transmission electron microscope to obtain a TEM image. The resulting image was electronically processed employing a flat head scanner Sitios 9231 manufactured by Konica Minolta Co., Ltd. to obtain electronic data, and the resulting electronic data was analyzed through an image analysis software, Image Pro Plus to obtain an average primary particle diameter of the microparticles in the image. Herein, the average primary particle diameter was represented by an average diameter of circles having the same area as the projected image of the particles in the TEM image. The relative standard deviation of the primary particle diameter of the microparticles was determined from the data obtained above.

Image analysis conditions are as follows:
Filter treatment: Median 3×3→Leveling 20 pixels 3→High Pass 3→Median 3×3

TABLE 1

| Silicon oxide microparticles | Average primary particle diameter (μm) | Relative standard deviation of a primary particle diameter (%) | Remarks |
|---|---|---|---|
| A | 0.08 | 10 | Comp. |
| B | 0.11 | 15 | Inv. |
| C | 0.29 | 5 | Inv. |
| D | 0.54 | 1 | Inv. |
| E | 0.98 | 10 | Inv. |
| F | 0.29 | 45 | Comp. |
| G | 0.54 | 40 | Comp. |
| H | 1.1 | 8 | Comp. |
| I | 1.21 | 12 | Comp. |

Comp.: Comparative,
Inv.: Inventive

TABLE 2

| Silicon oxide microparticles | | Average particle diameter (μm) in addition solution | Average primary particle diameter (μm) | Relative standard deviation (%) of a primary particle diameter | Remarks |
|---|---|---|---|---|---|
| Addition solution | Microparticles | | | | |
| a | A | 0.09 | 0.08 | 10 | Comp. |
| b | B | 0.12 | 0.11 | 15 | Inv. |
| c | C | 0.3 | 0.29 | 5 | Inv. |
| d | D | 0.55 | 0.54 | 1 | Inv. |
| e | E | 0.99 | 0.98 | 10 | Inv. |
| f | F | 0.3 | 0.29 | 45 | Comp. |
| g | G | 0.55 | 0.54 | 40 | Comp. |
| h | H | 1.11 | 1.1 | 8 | Comp. |
| i | I | 1.25 | 1.21 | 12 | Comp. |

Comp.: Comparative,
Inv.: Inventive (Preparation of In-Line Addition Solution A)

| Tinuvin 109 (produced by Ciba Specialty Chemicals Inc.) | 11 parts by weight |
|---|---|
| Tinuvin 171 (produced by Ciba Specialty Chemicals Inc.) | 5 parts by weight |
| Methylene chloride | 88 parts by weight |
| Ethanol | 12 parts by weight |

The above materials were placed in a sealed reaction vessel and well dissolved by heating and stirring. Six parts by weight of cellulose acetate propionate (total acyl substitution degree: 2.65, acetyl substitution degree: 1.90, propionyl substitution degree: 0.75) were added to the resulting solution while stirring, further stirred for 120 minutes, and filtered with an SF filter cartridge SL-100 produced by ROKI TECHNO Co., Ltd. to prepare In-line addition solution A.

(Preparation of Main Dope A)

| Cellulose triacetate prepared from cotton linter Mn = 14,800, Mw = 310,000, Mw/Mn = 2.1) | 100 parts by weight |
|---|---|
| Formula A exemplified compound 16 | 5.0 parts by weight |

-continued

| Ethylphthalyl ethyl glycolate | 5.5 parts by weight |
|---|---|
| Methylene chloride | 440 parts by weight |
| Ethanol | 40 parts by weight |

The above materials were placed in a sealed vessel, added with the silicon oxide addition solution as shown in Table 3 in an amount as shown in Table 3 while heating and stirring the mixture, and filtered with a press filter device with a filter capturing particles having a particle diameter of not less than 3 μm, and providing a filtration time of 10 sec/100 ml to prepare Main dope A. The filtration area of the press filter device was 50 m².

(Preparation of Cellulose Ester Film Samples 1 through 15)

In a film forming line, the dope A was filtered with Finemet NF (produced by Nippon Seisen Co., Ltd.). In an in-line addition solution line, the in-line addition solution A was filtered with Finemet NF (produced by Nippon Seisen Co., Ltd.). 2.5 weight parts of the filtered In-line Addition Solution A was added to 100 weight parts of the filtered Dope A. The resulting mixture was well stirred using an in-line mixer (Hi-Mixer, SWJ produced by Toray Corp.), and cast onto 1800 mm wide stainless steel belt support, at 35° C. The solvent in the formed web was evaporated until the residual amount of solvent decreased to 100%, and the web was peeled from the support at a peeling force of 162 Newton/m. The web was further dried at 35° C. and trimmed to a width of 1650 mm. Then, the web was further dried at 135° C. while the web was stretched in the transverse direction by a factor of 1.07 using a tenter. The amount of residual solvent in the film was 10% when the tenter stretching was started. The web was further passed through drying zones of 110° C. and 120° C. while being transported on many rollers to finalize drying. Then, the resulting web was slit to a width of 1430 mm, and both edges of the web were subjected to a knurling treatment of a 10 mm width and a 5 μm height, and wounded around a 6 inch core at an initial tension of 220 N/m and at a final tension of 110 N/m to prepare cellulose ester film sample 1. The stretching factor in the MD direction, which was calculated from the rotational speed of the stainless steel belt support and the driving speed of the tenter, was 1.08. The amount of the residual solvent of the resulting cellulose ester film sample 1 was 0.004%. The final film thickness was 80 μu and the length of the film was 5200 m.

Cellulose ester film samples 2 through 15 were prepared in the same manner as in Cellulose ester film sample 1, except that silicone oxide addition solutions were changed as shown in Table 3.

The following hard coat layer was provided on the surface of the samples 1 through 15 obtained above.

<<Hard Coat Layer>>

(Hard Coat Layer Coating Solution)

| Dipentaerythritol hexacrylate monomer | 60 parts by weight |
|---|---|
| Dipentaerythritol hexacrylate dimmer | 20 parts by weight |
| Dipentaerythritol hexacrylate trimer or its polymer higher than the trimer | 20 parts by weight |
| Diethoxybenzophenone (UV initiator) | 2 parts by weight |
| Isopropyl alcohol | 50 parts by weight |
| Ethyl acetate | 50 parts by weight |
| Methyl ethyl ketone | 50 parts by weight |

The hard coat layer coating solution was extrusion coated on the sample, and dried at 80° C. to form a coated layer. Successively, the coated layer was exposed to ultraviolet rays at an exposure amount of 150 mJ/cm² to form a hard coat layer with a thickness of 5 μm having a refractive index of 1.5. Thus, hard coat film samples 1 through 15 were prepared.

<<Evaluation>>

The resulting samples were evaluated according to the following. The results are shown in Table 3.

(Average Particle Size of Particles in the Samples)

The cellulose ester film samples were covered with an epoxy resin, and cut into a strip with a thickness of 100 nm employing Ultramicrotome. The resulting strip was photographed (by a factor of from 2,500 to 100,000) through a transmission electron microscope 2000FX produced by Nippon Densi Co., Ltd. (acceleration voltage: 200 kV) to obtain a TES image. The resulting image was electronically processed employing a flat head scanner Sitios 9231 manufactured by Konica Minolta Co., Ltd. to obtain electronic data, and the resulting electronic data was analyzed through an image analysis software, Image Pro Plus to obtain an average particle diameter of the microparticles in the strip. Herein, the average particle diameter was represented by an average diameter of circles having the same area as the projected images of the particles in the TEM Image.

<Image Analysis Conditions>
Filter treatment: Median 3×3→Leveling 20 pixels 3→High Pass 3→Median 3×3

(Ra, Surface Peak Density)

The center-line average roughness Ra of the cellulose ester film sample was measured at 23° C. and at a relative humidity (RH) of 50%±5% at an objective lens magnification of 50 and at an image zoom magnification of 1.0, employing a three dimensional surface structure analysis microscope zygo new View 5000 available from Canon Sales Co., Inc. The number of peaks with a height of 3 to 500 nm on the film surface was measured, and divided by the area to be measured to obtain the number per unit area ($1/mm^2$) of the peaks.

(Haze)

Three sheets of cellulose ester film samples were superposed, and haze of the resulting materials was measured employing T-2600 DA available from Tokyo Denshoku Co., Ltd., according to ASTM-D1003-52.

(Measurement of Coefficient of Dynamic Friction)

The coefficient of dynamic friction between one and the other surface of the film sample was measured according to JIS-K-7125-ISO 8295. The film sample was cut to contact the one surface of the film with the other surface. A load with a weight of 200 g was put at a contacting area of 80 mm×200 mm on the resulting material in which one surface of the film contacted the other surface, and pulled in the horizontal direction at a sample moving speed of 100 mm/sec. The coefficient of dynamic friction is represented by the following formula:

Coefficient of dynamic friction= $F\ (gf)$/Load weight$(gf)$ wherein F represents average force applied while the load is moving.

(Flatness)

After the wound cellulose ester film sample was stored at 35° C. and at 80% RH for 10 days, a 500 m long film sample was unwound and cut to obtain a sample with a length of 1 m. Then, a lighted fluorescent lamp tube was reflected in the resulting sample, and the reflected tube image was observed and evaluated according to the following criteria.

A: The reflected image was clear and free from distortion.
B: The reflected image looked slightly distorted but was not problematic for practical use.
C: The reflected image looked distorted and was problematic for practical use.

(Interference Unevenness)

The surface of the hard coat film opposite the hard coat layer was rubbed with a sand paper and coated with a black coating for matting. Then, the resulting film was observed from the hard coat layer side, and evaluated for interference unevenness according to the following criteria:

A: no interference unevenness was observed.
B: Slight interference unevenness was recognized but was not problematic for practical use.
C: Interference unevenness was recognized and was problematic for practical use.

TABLE 3

| Cellulose ester film sample | Addition solution | Silicon oxide Addition amount (parts by weight) | Average particle diameter (μm) in addition solution | Relative standard deviation of primary particle diameter (%) | Remarks | Peak density ($1/mm^2$) | Ra (μm) | Average particle diameter (μm) in film | Haze (%) | Coefficient of friction | Flatness | Interference unevenness |
|---|---|---|---|---|---|---|---|---|---|---|---|---|
| 1 | a | 5.4 | 0.09 | 10 | Comp. | 7214 | 0.002 | 0.09 | 0.41 | 1.38 | C | C |
| 2 | b | 5.0 | 0.12 | 15 | Inv. | 5512 | 0.002 | 0.12 | 0.42 | 0.63 | B | B |
| 3 | c | 4.6 | 0.30 | 5 | Inv. | 4288 | 0.003 | 0.30 | 0.42 | 0.61 | A | A |
| 4 | d | 3.8 | 0.55 | 1 | Inv. | 4157 | 0.003 | 0.55 | 0.42 | 0.60 | A | A |
| 5 | e | 3.0 | 0.99 | 10 | Inv. | 4280 | 0.003 | 0.99 | 0.45 | 0.60 | B | B |
| 6 | f | 4.6 | 0.30 | 45 | Comp. | 5800 | 0.003 | 0.40 | 0.74 | 0.62 | B | C |
| 7 | g | 3.8 | 0.55 | 40 | Comp. | 9200 | 0.004 | 0.63 | 0.83 | 0.62 | C | C |
| 8 | h | 2.5 | 1.11 | 8 | Comp. | 4123 | 0.004 | 1.05 | 0.98 | 0.60 | B | B |
| 9 | I | 2.2 | 1.25 | 12 | Comp. | 4086 | 0.004 | 1.25 | 1.80 | 0.61 | B | C |
| 10 | c | 2.2 | 0.30 | 5 | Comp. | 538 | 0.003 | 0.30 | 0.30 | 1.45 | C | C |
| 11 | c | 3.0 | 0.30 | 5 | Inv. | 1081 | 0.003 | 0.30 | 0.35 | 0.70 | B | B |
| 12 | c | 3.8 | 0.30 | 5 | Inv. | 2504 | 0.003 | 0.30 | 0.37 | 0.65 | A | A |
| 13 | c | 5.2 | 0.30 | 5 | Inv. | 5510 | 0.003 | 0.30 | 0.43 | 0.61 | A | A |
| 14 | c | 6.0 | 0.30 | 5 | Inv. | 7950 | 0.003 | 0.30 | 0.61 | 0.61 | B | B |
| 15 | c | 6.8 | 0.30 | 5 | Comp. | 9005 | 0.003 | 0.30 | 1.82 | 0.62 | C | C |

Comp.: Comparative,
Inv.: Inventive

As is apparent from Table 3, the inventive cellulose ester film sample with a surface peak density of from 1,000 to 8,000 (1/mm$^2$), comprising microparticles having an average primary particle diameter of from 0.1 to 1.0 μm and a relative standard deviation of from 1 to 20%, provides reduced haze, high transparency, and excellent storage stability. Particularly, the inventive cellulose ester film samples are superior in both transparency and interference unevenness after hard coat layer coating. There is no haze deterioration due to stretching in the inventive samples, which means good compatibility of the microparticles in the invention with cellulose ester.

Example 2

(Preparation of Cellulose Ester Film Samples 16 through 23)

(Main Dope C)

| | |
|---|---|
| Cellulose acetate (an acetylation degree of 60.9%) | 89.5 parts by weight |
| Triphenyl phosphate | 7.0 parts by weight |
| Biphenyl diphenyl phosphate | 3.5 parts by weight |

The above materials were dissolved in the following mixture solvent and stirred to obtain a dope with a solid concentration of 23.0% by weight.

| | |
|---|---|
| Methylene chloride | 82 parts by weight |
| Methanol | 15 parts by weight |
| n-Butanol | 3.0 parts by weight |

The resulting dope was filtered using a filter paper "#63" manufactured by Toyo Filter Paper Co. Ltd., further filtered using a sintered metal filter "06N" produced by Nippon Seisen Co., Ltd., and further filtered using a sintered metal filter "12N" (with a pore diameter of 40 μm) produced by Nippon Seisen Co., Ltd.

(Preparation of In-Line Addition Solution X)

| | |
|---|---|
| 2(2'-Hydroxy-3',5'-di-tert-butylphenyl)-5-chlorobenzotriazole | 5.40 parts by weight |
| 2(2'-Hydroxy-3',5'-di-tert-amylphenyl)-5-chlorobenzotriazole | 10.79 parts by weight |
| Silica (Aerosil R972, produced by Nippon Aerosil Co., Ltd.) | 0.39 parts by weight |
| Cellulose acetate (an acetylation degree of 60.9%) | 2.58 parts by weight |
| Triphenyl phosphate | 0.28 parts by weight |
| Biphenyl diphenyl phosphate | 0.14 parts by weight |
| Methylene chloride | 67.71 parts by weight |
| Methanol | 10.86 parts by weight |
| n-Butanol | 1.85 parts by weight |

The above materials were mixed and dispersed in an atriter to give an average particle diameter of 0.6 μm. The resulting dispersion was filtered using a filter paper "#63" manufactured by Toyo Filter Paper Co. Ltd., further filtered using a sintered metal filter "07N" produced by Nippon Seisen Co., Ltd.

Figure 2:
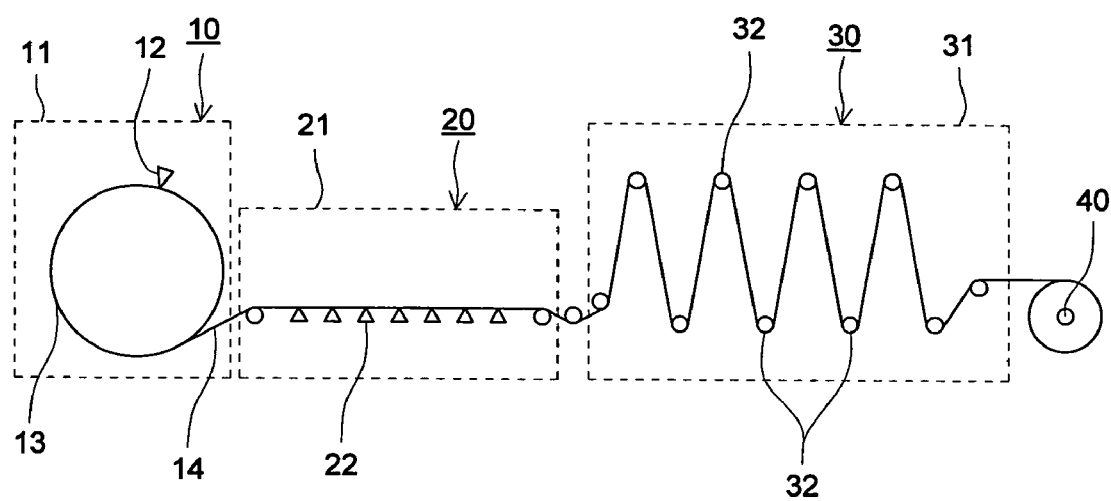
FIG. 2 is a schematic view showing one embodiment of a drum casting system.

In-line addition solution X was added to Dope C in a dope transporting tube employing a static mixer, so that the UV absorbent content was 1.14% by weight based on the solid component of the Dope, and mixed. The resulting mixture was cast employing a drum casting system in FIG. 2 to form a film web. Temperature of the drum 13 was −3° C. When the film web was self-supporting, the web was peeled from the drum, transported in a tenter dryer 20, and dried while holding the both sides of the web and applying a tension. The resulting web was further dried in a roller drying section 30, and wound around a spool 40. In the roller drying section, the web surface temperature was elevated to maximum temperature of 139° C. The resulting film had a dry thickness of 80 μm. The casting condition or the drying condition was adjusted so that retardation in the film thickness direction Rt was 90 nm. Thus, cellulose ester film sample 16 was prepared. In FIG. 2, numerical number 10 shows a casting section, numerical number 11 shows a drying chamber, numerical number 12 shows a casting die, numerical number 14 shows a peeling section, numerical number 21 shows a drying section, numerical number 22 shows a supporting member, numerical number 31 shows a drying section, and numerical number 32 shows a transporting roller.

The following in-line addition solutions b through h were prepared. Cellulose ester film sample 17 through 23 were prepared in the same manner as in cellulose ester film sample 16, except that in-line addition solutions b through h were used instead of in-line addition solution X.

(Preparation of In-Line Addition Solution b)

| | |
|---|---|
| Triazine compound UVT-1 (described later) | 16.19 parts by weight |
| Silicon oxide B used in Example 1 | 0.39 parts by weight |
| Cellulose acetate (an acetylation degree of 60.9%) | 2.58 parts by weight |
| Triphenyl phosphate | 0.28 parts by weight |
| Biphenyl diphenyl phosphate | 0.14 parts by weight |
| Methylene chloride | 67.71 parts by weight |
| Methanol | 10.86 parts by weight |
| n-Butanol | 1.85 parts by weight |

UVT-1

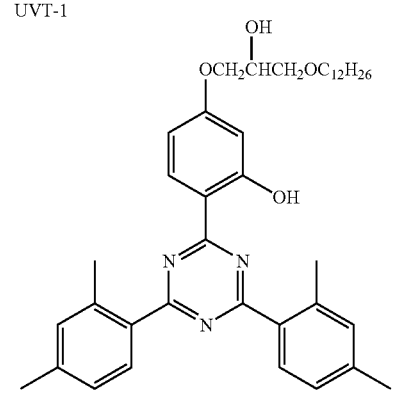

The above materials were mixed and dispersed in a Nanomizer in the same manner as In-line addition solution X, except that dispersion was carried out under the condition described below. Thus, In-line addition solution b was prepared.

Dispersion condition: Through-type Generator KD; Pressure applied 10 MPa; Two passes (Preparation of In-Line Addition Solution c)

In-line addition solution c was prepared in the same manner as in In-line addition solution b, except that silicon oxide C used in Example 1 was used instead of silicon oxide B.

(Preparation of In-Line Addition Solution d)

In-line addition solution d was prepared in the same manner as in In-line addition solution b, except that silicon oxide D used in Example 1 was used instead of silicon oxide B.

(Preparation of In-Line Addition Solution e)

In-line addition solution e was prepared in the same manner as in In-line addition solution b, except that silicon oxide E used in Example 1 was used instead of silicon oxide B.

(Preparation of In-Line Addition Solution f)

In-line addition solution f was prepared in the same manner as in In-line addition solution b, except that silicon oxide F used in Example 1 was used instead of silicon oxide B.

(Preparation of In-Line Addition Solution g).

In-line addition solution g was prepared in the same manner as in In-line addition solution b, except that silicon oxide G used in Example 1 was used instead of silicon oxide B.

(Preparation of In-Line Addition Solution h)

In-line addition solution h was prepared in the same manner as in In-line addition solution b, except that silicon oxide H used in Example 1 was used instead of silicon oxide B.

The following anti-glare layer coating solution was extrusion coated on the cellulose ester film sample, and dried at 80° C. to form a coated layer. Successively, the coated layer was exposed to ultraviolet rays at an exposure amount of 150 mJ/cm$^2$ to form a anti-glare layer with a thickness of 3 μm (having a refractive index of 1.52). Thus, anti-glare hard coat film samples 16 through 23 were prepared.

(Unevenness)

The surface of the anti-glare hard coat film sample opposite the anti-glare hard coat layer was rubbed with a sand paper and coated with a black coating for matting. Then, the resulting sample was observed from the anti-glare hard coat layer side, and evaluated for unevenness according to the following criteria:

A: No unevenness was observed.

B: Slight unevenness was recognized but was not problematic for practical use.

C: Unevenness was recognized and was problematic for practical use.

(Rt Variation)

Retardation in the thickness direction Rt of cellulose ester film before accelerated aging and Rt of cellulose ester film after accelerated aging were determined. In the accelerated aging, the cellulose ester film was exposed to a sunshine weather meter without a UV cut filter for 500 hours. Rt variation is represented by the following formula:

$$Rt \text{ variation} = \{(Rt \text{ of cellulose ester film before accelerated aging}/Rt \text{ of cellulose ester film after accelerated aging}) - 1\} \times 100$$

TABLE 4

| Cellulose ester film sample | Inline addition solution | Silicon oxide Average primary particle diameter (μm) | Silicon oxide Relative standard deviation of primary particle diameter (%) | Remarks | Peak density (1/mm$^2$) | Ra (μm) | Average particle diameter (μm) in film | Haze (%) | Coefficient of friction | Flatness | Unevenness | Rt variation (%) |
|---|---|---|---|---|---|---|---|---|---|---|---|---|
| 16 | X | 0.016 | 50 | Comp. | 18122 | 0.002 | 0.58 | 0.91 | 1.38 | C | C | 23.0 |
| 17 | b | 0.11 | 15 | Inv. | 4105 | 0.002 | 0.12 | 0.42 | 0.63 | A | A | 1.0 |
| 18 | c | 0.29 | 5 | Inv. | 3514 | 0.003 | 0.30 | 0.42 | 0.61 | A | A | 0.8 |
| 19 | d | 0.54 | 1 | Inv. | 3087 | 0.003 | 0.55 | 0.42 | 0.60 | A | A | 1.1 |
| 20 | e | 0.98 | 10 | Inv. | 4300 | 0.004 | 0.99 | 0.45 | 0.62 | B | B | 2.0 |
| 21 | f | 0.29 | 45 | Comp. | 8500 | 0.004 | 0.40 | 0.75 | 0.60 | B | C | 10.5 |
| 22 | g | 0.54 | 40 | Comp. | 9200 | 0.004 | 0.66 | 0.99 | 0.62 | B | C | 11.0 |
| 23 | h | 1.11 | 8 | Comp. | 4120 | 0.004 | 1.12 | 1.05 | 0.60 | B | C | 8.0 |

Comp.: Comparative,
Inv.: Inventive

<Anti-Glare Layer Coating Solution>

| | |
|---|---|
| Dipentaerythritol hexacrylate | 100 parts by weight |
| Photoinitiator IRGACURE 184 (produced by Ciba Specialty Co., Ltd.) | 5 parts by weight |
| Ethyl acetate | 120 parts by weight |
| Propylene glycol monomethyl ether | 120 parts by weight |
| Silicon compound BYK-307 (produced by BYK chemie Japan Co., Ltd.) | 0.4 parts by weight |
| Cross-linked polystyrene particles (SX350H, particle diameter: 3.5 μm, produced by Soken Kagaku Co., Ltd.) | 10 parts by weight |
| Silicon oxide particles (Aerosil R972V, produced by Nippon Aerosil Co., Ltd.) | 5 parts by weight |

The resulting samples were evaluated in the same manner as in Example 1, and further evaluated for unevenness and Rt variation under the following criteria. The results are shown in Table 4.

As is apparent from Table 4, the Inventive cellulose ester film reproduces the results of Example 1, and the 1,3,5-triazine compound reduces Rt variation after the UV exposure. The inventive cellulose ester film is free from unevenness, provides a reflected fluorescent lamp image free from distortion, and provides excellent anti-glare effect compared with comparative cellulose ester film.

Example 3

The following antireflection layer solution was coated on the hard coat film samples 16 through 23 obtained above, to prepare hard coat film samples 16' through 23' with an antireflection layer.

<<Multi-Antireflection Layer Formation>>

<Medium Refractive Index Layer Coating Solution>

| | |
|---|---|
| Titanium tetra-n-butoxide | 250 parts by weight |
| End group-reactive dimethylsilicone oil L-9000 produced by Nippon Unicar Co., Ltd.) | 0.48 parts by weight |
| Aminopropyltrimethoxysilane KBE 903 (produced by Shinetsu Kagaku Co., Ltd.) | 22 parts by weight |
| UV-curable epoxy resine KR 500 (produced by Asahi Denka Co., Ltd.) | 21 parts by weight |
| Propylene glycol monomethyl ether | 4900 parts by weight |
| Isopropyl alcohol | 4840 parts by weight |

<High Refractive Index Layer Coating Solution>

| | |
|---|---|
| Titanium tetra-n-butoxide | 310 parts by weight |
| End group-reactive dimethylsilicone oil L-9000 produced by Nippon Unicar Co., Ltd.) | 0.4 parts by weight |
| Aminopropyltrimethoxysilane KBE 903 (produced by Shinetsu Kagaku Co., Ltd.) | 4.8 parts by weight |
| UV-curable epoxy resine KR 500 (produced by Asahi Denka Co., Ltd.) | 4.6 parts by weight |
| Propylene glycol monomethyl ether | 4900 parts by weight |
| Isopropyl alcohol | 4800 parts by weight |

(Preparation of Tetraethoxysilane Hydrolyzate A)

Tetraethoxysilane of 580 g and 1144 g of ethanol were mixed, and an aqueous citric acid solution (one in which 5.4 g of citric acid monohydrate was dissolved in 272 g of water) was added to the mixture. The resulting mixture was stirred at 25° C. for 1 hour to prepare tetraethoxysilane hydrolyzate A.

<Low Refractive Index Layer Coating Solution>

| | |
|---|---|
| Tetraethoxysilane hydrolyzate A | 1020 parts by weight |
| End group-reactive dimethylsilicone oil L-9000 produced by Nippon Unicar Co., Ltd.) | 0.42 parts by weight |
| Propylene glycol monomethyl ether | 2700 parts by weight |
| Isopropyl alcohol | 6300 parts by weight |

The medium, high, and low refractive index layers were coated on the hard coat layer of the hard coat film sample in that order, employing a die, and dried at 120° C. The resulting dried layers were subjected to ultraviolet light irradiation under the same conditions as in the hard coat layer to form a multi-antireflection layer. The solution supply amount was controlled while measuring the wet thickness of each layer during coating.

The thickness of the medium, high, and low refractive index layers were 75 nm, 70 nm, and 93 nm, respectively. Thus, hard coat film samples 16' through 23' with an antireflection layer were prepared.

The refractive index and thickness of each refractive index layer were obtained, measuring spectral reflectance of a single layer of each layer through a spectrophotometer. The spectral reflectance in a visible wavelength region (400-700 nm) was measured under condition of a 5° regular reflection through a spectrophotometer TYPE 1U-4000 (produced by Hitachi Seisakusho Co., Ltd.). A sample for the measurement was prepared in which the rear surface of the sample opposite the surface to be measured was surface-roughened and subjected to light absorbing treatment employing with black spray in order to prevent light reflection on the rear surface.

The refractive index of the single medium, high, and low refractive index layers was 1.65, 1.90, and 1.45, respectively.

<<Preparation of Polarizing Plate>>

A 120 μm thick polyvinyl alcohol film was immersed in 100 kg of an aqueous solution containing 1 kg of iodine, 2 kg of potassium iodide, and 4 kg of boric acid, and stretched at 50° C. by a factor of 4 to obtain a polarizing film with a width of 1.4 m.

The hard coat film sample with an anti-reflection layer obtained above was immersed in an aqueous 2 mol/liter sodium hydroxide solution at 60° C. for 1 minute for saponification. Herein, the antireflection layer was laminated with a 40 μm thick protective film of polyester and protected from the alkali solution.

A 10% aqueous solution of polyvinyl alcohol (PVA 203, saponification degree: 86.5 to 89.5%, average polymerization degree: 300, produced by Kuraray Co., Ltd.) was coated on the adhesive layer of KC8UX2M produced by Konica Minolta Opt Co., Ltd. to form a polyvinyl alcohol layer. Similarly, the polyvinyl alcohol solution was coated on the surface of the hard coat film sample opposite the antireflection layer to form a polyvinyl alcohol layer. The former was laminated onto one surface of the polarizing film through the polyvinyl alcohol layer, and the latter onto the other surface of the polarizing film through the polyvinyl alcohol layer.

Successively, pressure was applied roll to roll to the resulting laminate before drying of polyvinyl alcohol, dried at 70° C. for 3 minutes, and wound around a core. Thus, a polarizing plate was prepared.

<<Evaluation>>

The polarizing plate was evaluated for flatness according to the following method.

(Flatness)

The polarizing plate was placed under a fluorescent lamp, and the reflected fluorescent lamp was visually observed. An inventive polarizing plate employing the cellulose ester film of the invention provided a less distorted reflected image, while a comparative polarizing plate provided a distorted reflected image.

<<Preparation of Liquid Crystal Display>>

The original polarizing plate was peeled from both sides of the liquid crystal cell of a liquid crystal display panel LL-T1620 (produced by Sharp Co., Ltd.). The polarizing plate prepared above was adhered onto both sides of the liquid crystal cell through an adhesive so that its transmission axis direction was in accordance with those of the original polarizing plate before peeled. The resulting material was installed in the liquid crystal display panel LL-T1620 to prepare a liquid crystal display.

The liquid crystal display obtained above was visually observed and evaluated for visibility and color shading. The liquid crystal display, comprising a polarizing plate employing the cellulose ester film of the invention, is excellent in visibility without color shading, and prevents eyestrains in long time viewing. A comparative liquid crystal display, comprising a comparative polarizing plate, provides color shading or wavy irregularities, resulting in lowering of display quality.

The invention claimed is:

1. A cellulose ester film containing cellulose ester and microparticles having an average primary particle diameter of from 0.1 to 1.0 μm, wherein a relative standard deviation of a primary particle diameter of the microparticles is from 1 to 20%, and wherein the cellulose ester film has a surface with a peak density of from 1,000 to 8,000 (1/mm$^2$), the peak density representing the number of peaks with a height of from 3 to 500 nm on the film surface measured employing a three dimensional surface structure analysis microscope in terms of the peak number per 1 mm² of the film.

2. The cellulose ester film of claim 1, wherein the film is stretched at a stretching magnification of from 1.05 to 1.3 in at least one direction of the mechanical (MD) direction and the transverse (TD) direction.

3. The cellulose ester film of claim 1, wherein the film contains an aromatic compound having a 1,3,5-triazine ring as a UV absorbent.

4. The cellulose ester film of claim 3, wherein the aromatic compound is a compound represented by formula (I): Formula (I)

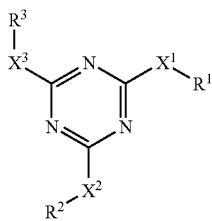

Formula (I)

wherein $X^1$ represents a single bond, —$NR^4$—, —O— or —S—; $X^2$ represents a single bond, —$NR^5$—, —O— or —S—, $X^3$ represents a single bond, —$NR^6$—, —O— or —S—; $R^1$, $R^2$, and $R^3$ each represents an alkyl. group, an alkenyl group, an aryl group or a heterocyclic group; and $R^4$, $R^5$ and $R^6$ each represents a hydrogen atom, an alkyl group, an alkenyl group, an aryl group or a heterocyclic group.

5. The cellulose ester film of claim 1, wherein the film contains a plasticizer in an amount of from 1 to 30% by weight.

6. The cellulose ester film of claim 1, wherein the film contains a plasticizer in an amount of from 2 to 25% by weight.

7. The cellulose ester film of claim 5, wherein the plasticizer is an ester of a polyhydric alcohol with a monocarboxylic acid.

8. The cellulose ester film of claim 1, wherein the film contains the cellulose ester in an amount of from 60 to 95% by weight.

9. The cellulose ester film of claim 1, wherein the film contains the microparticles in an amount of from 0.02 g/m² to 1.0 g/m².

10. The cellulose ester film of claim 1, wherein the film contains the microparticles in an amount of from 0.03 g/m² to 0.3 g/m².

11. The cellulose ester film of claim 1, wherein the film has a thickness of from 10 to 120 μm.

12. The cellulose ester film of claim 1, wherein the film has a thickness of from 10 to 60 μm.

13. A polarizing plate comprising a polarizing film and the cellulose ester film of claim 1.

14. A liquid crystal display comprising a liquid crystal cell and the cellulose ester film of claim 1.

15. The liquid crystal display of claim 14, further comprising a polarizing film.

* * * * *